United States Patent
Kreder, III et al.

(10) Patent No.: US 11,991,294 B2
(45) Date of Patent: May 21, 2024

(54) PEER-TO-PEER SECURE CONDITIONAL TRANSFER OF CRYPTOGRAPHIC DATA

(71) Applicant: GRIDPLUS, INC., Austin, TX (US)

(72) Inventors: Karl J. Kreder, III, Austin, TX (US); Daniel Wayne Veenstra, Austin, TX (US)

(73) Assignee: GRIDPLUS, INC., Austin, TX (US)

( * ) Notice: Subject to any disclaimer, the term of this patent is extended or adjusted under 35 U.S.C. 154(b) by 268 days.

(21) Appl. No.: 17/454,756

(22) Filed: Nov. 12, 2021

(65) Prior Publication Data

US 2023/0155839 A1    May 18, 2023

(51) Int. Cl.
    H04L 9/32 (2006.01)
    H04L 9/08 (2006.01)
    H04L 9/14 (2006.01)

(52) U.S. Cl.
    CPC .......... *H04L 9/3247* (2013.01); *H04L 9/0825* (2013.01); *H04L 9/14* (2013.01); *H04L 9/3236* (2013.01)

(58) Field of Classification Search
    CPC ....... H04L 9/0825; H04L 9/14; H04L 9/3236; H04L 9/3247; H04L 9/50; H04L 2209/56
    See application file for complete search history.

(56) References Cited

U.S. PATENT DOCUMENTS

| | | |
|---|---|---|
| 7,051,212 B2 | 5/2006 | Ginter et al. |
| 9,785,926 B2 | 10/2017 | Sanford et al. |
| 10,733,176 B2 | 8/2020 | Cochrane et al. |
| 2011/0307703 A1 | 12/2011 | Ogg et al. |

(Continued)

FOREIGN PATENT DOCUMENTS

| | | |
|---|---|---|
| AU | 2009239396 A1 | 10/2009 |
| CA | 2850250 C | 9/2020 |

(Continued)

OTHER PUBLICATIONS

"A First Look at the Grid+Lattice1 Hardware Wallet 11", 1 page, Oct. 18, 2018. Retrieved from the Internet: URL: https://www.youtube.com/watch?v=aypJYpWmxuk.

(Continued)

*Primary Examiner* — Gil H. Lee
(74) *Attorney, Agent, or Firm* — Lindauer Law, PLLC

(57) ABSTRACT

Secure conditional transfer of cryptographic data allows transfer of cryptographically-based data from one party to another while mitigating failure of a counterparty to perform. A first party uses a first device to send a proposal to a second party's device. If the proposal is accepted, it is signed by the second device. A secure channel is established between the devices that also attests to their compliance during processing. Transaction identifiers associated with the proposal and other information are exchanged. Once exchanged, the first device creates and sends first transfer data (that may be signed) to the second device. The second device receives and determines the first transfer data is valid. In response, the second device creates and sends second transfer data (that may be signed) to the first device. If a communication or other failure prevents reciprocation by the second party, others may verify the transaction and confirm the failure.

20 Claims, 12 Drawing Sheets

(56) References Cited

U.S. PATENT DOCUMENTS

| | | | |
|---|---|---|---|
| 2014/0196107 A1 | 7/2014 | Lindberg et al. | |
| 2014/0258736 A1 | 9/2014 | Merchan et al. | |
| 2016/0149710 A1 | 5/2016 | Huxham et al. | |
| 2016/0275461 A1 | 9/2016 | Sprague et al. | |
| 2016/0294564 A1 | 10/2016 | Mock | |
| 2016/0306953 A1 | 10/2016 | Cambou | |
| 2017/0221288 A1 | 8/2017 | Johnson et al. | |
| 2018/0041345 A1 | 2/2018 | Maim | |
| 2018/0254898 A1 | 9/2018 | Sprague et al. | |
| 2019/0013943 A1 | 1/2019 | Maim | |
| 2019/0122186 A1* | 4/2019 | Kano | G06Q 20/3829 |
| 2019/0156301 A1 | 5/2019 | Bentov et al. | |
| 2019/0180273 A1 | 6/2019 | Cummings et al. | |
| 2019/0220603 A1 | 7/2019 | Gopalakrishnan et al. | |
| 2019/0253253 A1* | 8/2019 | Yang | G16H 10/60 |
| 2019/0268332 A1 | 8/2019 | Wang | |
| 2019/0280864 A1 | 9/2019 | Cheng et al. | |
| 2019/0378119 A1 | 12/2019 | Hyuga et al. | |
| 2019/0394025 A1 | 12/2019 | Maim | |
| 2020/0021446 A1 | 1/2020 | Roennow et al. | |
| 2020/0036519 A1 | 1/2020 | Bitauld et al. | |
| 2020/0099518 A1 | 3/2020 | Jacobs et al. | |
| 2020/0143466 A1 | 5/2020 | Wu et al. | |
| 2020/0153627 A1 | 5/2020 | Wentz | |
| 2020/0242711 A1* | 7/2020 | Cao | H04L 9/0894 |
| 2020/0387893 A1 | 12/2020 | Maim | |
| 2022/0029822 A1* | 1/2022 | Ubbens | H04L 9/3247 |
| 2022/0286275 A1* | 9/2022 | Davis | H04L 9/0825 |

FOREIGN PATENT DOCUMENTS

| | | |
|---|---|---|
| WO | 2016120826 A2 | 8/2016 |
| WO | 2017122187 A2 | 7/2017 |
| WO | 2018211382 A1 | 11/2018 |

OTHER PUBLICATIONS

"DevCon4 Lattice Demo", 1 page, Nov. 28, 2018. Retrieved from the Internet: URL: https://www.youtube.com/watch?v=YkJpQ19hYYU.

"Filament Security Overview Networking Devices at the Edge of Risk", Apr. 1, 2017, 12 pages. Retrieved from the Internet: URL:https://filamet.com/assets/downloads/Filament%20Security.pdf.

"Gemalto and Ledger Join Forces to Provide Security Infrastructure for Cryptocurrency Based Activities", Oct. 14, 2017, 3 pages, Thales Group 2021. Retrieved from the Internet: URL: https://www.thalesgroup.com/en/markets/digital-identity-and-security/press-release/gemalto-and-ledger-join-forces-to-provide-security-infrastructure-for-cryptocurrency-based-activities-.

"How to DeFi on Polkadot Series", 23 pages, Polkaswap Community Collective, Medium.com. Retrieved from the Internet: URL: https://medium.com/@polkaswapcommunitycollective/how-to-defi-on-polkadot-series-b7c34733d5f5.

"Lattice1 Safe Cards", 1 page, Oct. 29, 2018. Retrieved from the Internet: URL: https://www.youtube.com/watch?v=ZIKOhYWIGyE.

"Ledger", Ledger SAS, 13 pages. Retrieved from the Internet: URL: https://www.ledger.com/.

"OpenPGP card", Wikipedia, 3 pages. Retrieved from the Internet on Sep. 29, 2021. URL: https://en.wikipedia.org/wiki/OpenPGP_card.

"PKCS #11 Cryptographic Token Interface Base Specification Version 2.40", OASIS, OASIS Standard, Apr. 14, 2015, pp. 1-149. Retrieved from the Internet: URL: http://docs.oasis-open.org/pkcs11/pkcs11-base/v2.40/os/pkcs11-base-v2.40-os.doc.

"SafePal Crypto Hardware Wallet (Official)", SafePal, 4 pages. Retrieved from the Internet: URL: https://www.safepal.io/.

"Specifys That Certs Must Be Checked to Receive Payment" Jun. 12, 2019. Retrieved from the Internet: URL: https://github.com/GridPlus/phonon-network/commit/77fe11a7d398268ad061029465a63bf66e653147.

"Supported Cryptocurrencies", SafePal, 2 pages. Retrieved from the Internet: URL: https://safepalsupport.zendesk.com/hc/en-us/articles/360057304752-Supported-Cryptocurrencies.

"Thales Luna HSMs", Thales 2021, 2 pages. Retrieved from the Internet: URL: https://cpl.thalesgroup.com/encryption/hardware-security-modules/network-hsms.

"Trezor Hardware Wallet (Official)", 50 pages. SatoshiLabs s.r.o 2012-2021. Retrieved from the Internet: URL: https://trezor.io/coins/.

"YubiKey", Wikipedia, 3 pages. Retrieved from the Internet on Sep. 29, 2021. URL: https://en.wikipedia.org/wiki/YubiKey.

Karst, et al., "Connecting Multiple Devices with Blockchain in the Internet of Things", Jan. 5, 2017, 23 pages. Retrieved from the internet: URL:https://courses.cs.ut.ee/MTAT.03.323/2016_fall/uploads/Main/002.pdf.

Lind, et al., "Teechan: Payment Channels Using Trusted Execution Environments", ARXIV.org, Cornell University Library, Ithaca, NY, Dec. 22, 2016, 15 pages.

Miller, et al., "Phonon Network Specification", GitHub, 10 pages. Retrieved from the Internet on Jun. 10, 2019: URL: https://github.com/GridPlus/phonon-network.

Poon, et al., "The Bitcoin Lightning Network: Scalable Off-Chain Instant Payments", Jan. 14, 2016. Retrieved from the Internet: URL: https://lightning.network/lightning-network-paper.pdf.

Veenstra, et al., "Phonon Network Specification", GitHub, 8 pages. Retrieved from the Internet on Sep. 16, 2020: URL: https://github.com/GridPlus/phonon-network.

Erdene-Ochir, O., "Patent Cooperation Treaty International Search Report and Written Opinion dated Mar. 15, 2023", Patent Cooperation Treaty Application No. PCT/US22/79649, Patent Cooperation Treaty, Mar. 15, 2023.

* cited by examiner

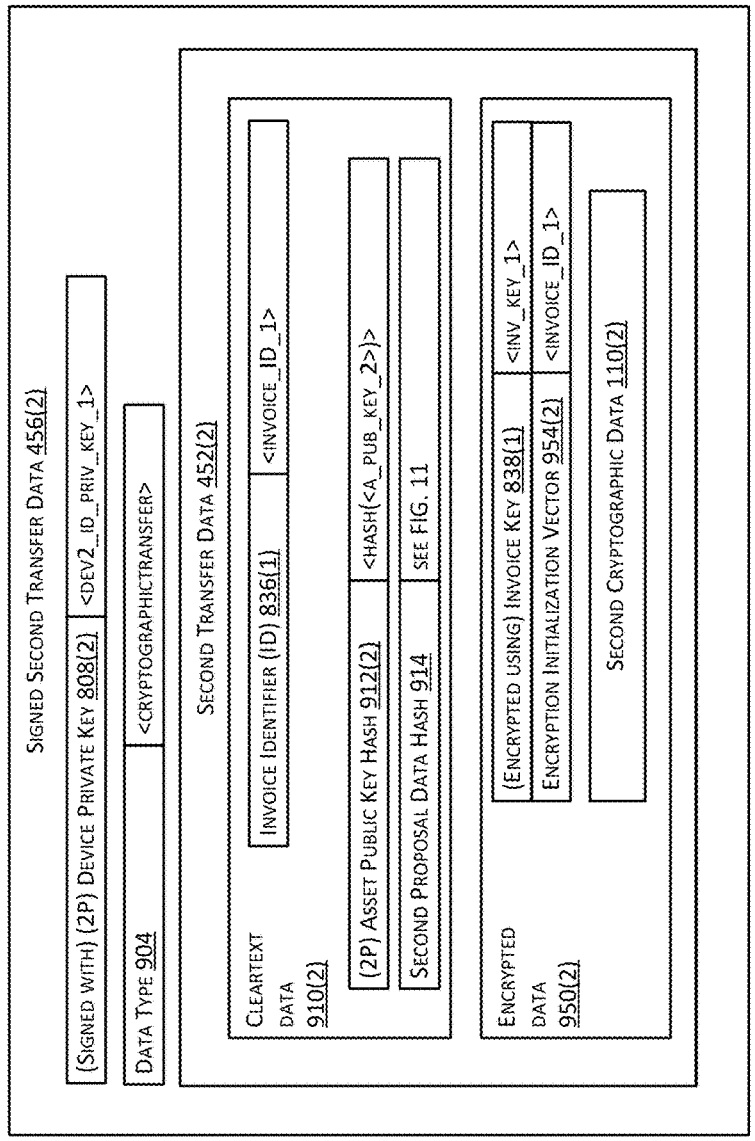
FIG. 12

US 11,991,294 B2

PEER-TO-PEER SECURE CONDITIONAL TRANSFER OF CRYPTOGRAPHIC DATA

INCORPORATION BY REFERENCE

U.S. patent application Ser. No. 16/057,290 filed Aug. 7, 2018, and titled "System for Secure Storage of Cryptographic Keys" is hereby incorporated by reference in its entirety.

U.S. patent application Ser. No. 16/440,870 filed Jun. 13, 2019, and titled "Dynamic Off-Chain Digital Currency Transaction Processing" is hereby incorporated by reference in its entirety.

U.S. patent application Ser. No. 17/454,565 filed Nov. 11, 2021, and titled "System For Secure Multi-Protocol Processing Of Cryptographic Data" is hereby incorporated by reference in its entirety.

BACKGROUND

An increasing number of systems rely on cryptographic secrets, such as private keys, for operation. For example, these systems may be used to securely store data, identify a particular individual or item, exchange value, and so forth.

BRIEF DESCRIPTION OF THE DRAWINGS

FIGS. 8-12 illustrate block diagrams of data associated with operation of the system, according to one implementation.

Figure 1:
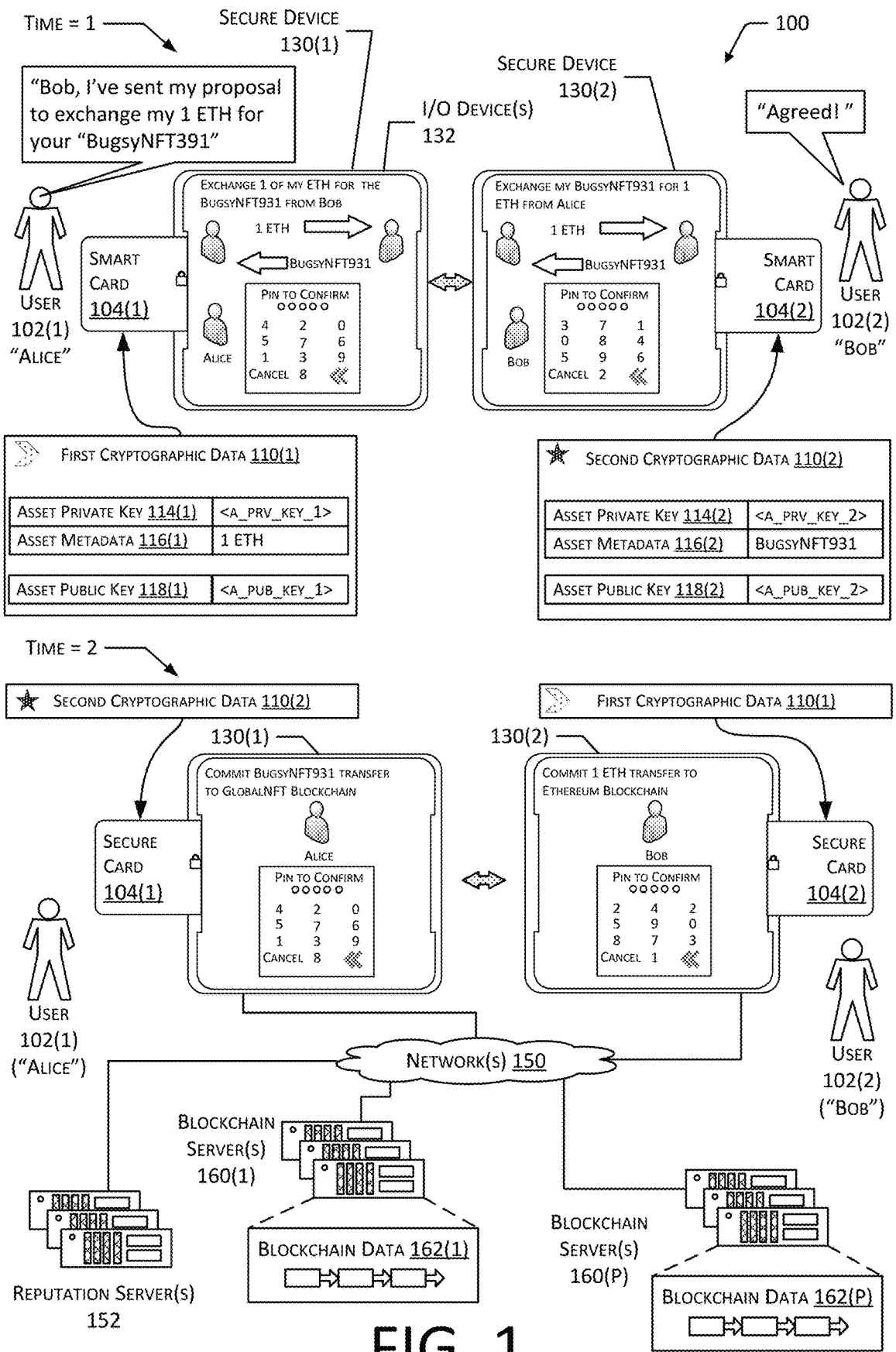
FIG. 1 depicts a system that provides peer-to-peer secure conditional transfer of cryptographic data, according to one implementation.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Cryptography and cryptographically based systems are critical to a wide variety of systems. For example, cryptography may be used to prevent disclosure of information to unintended parties, to provide digital signatures that assert the authenticity of a message, and so forth. Cryptographic data may include private keys used to provide a digital signature, to encrypt information, and so forth.

Systems such as distributed ledgers (or "blockchains") may utilize digital signatures to sign messages that, if validly signed, would result in updates to the distributed ledger that indicate transfers of tokens from one account to another. At any given time, a token is only associated with one cryptographic key pair. In some implementations, tokens may be used to represent assets. Blockchains provide for a decentralized, distributed trustless system, allowing participants to transfer value, participate in smart contracts, and so forth. For example, cryptocurrencies such as Bitcoin, Ethereum, Iota, Zcash, Monero, Cardano, and so forth utilize blockchains to operate. Digital cryptographic signatures (signatures) are used to determine if a message describing a proposed transaction is authentic, and whether the transaction is valid. A message is deemed to be authentic if the corresponding signature was produced using a specific private key. A transaction is deemed to be valid if the key pair is associated with sufficient balance as indicated in the global ledger or privilege as indicated in the global ledger to execute the transaction on the global ledger. For example, a message describing a transaction may be digitally signed with a private key using a cryptographic function. The private key is intended to remain known only by the party authorized to permit the transaction. Continuing the example, a message describing a transaction to transfer a specific amount of cryptocurrency from a source address that is derived from the signer's private key to a destination address may be digitally signed by the holder of the source private key. The message is then sent to one or more blockchain servers. A blockchain server receives the message and checks the digital signature. If the digital signature is authentic and valid, the blockchain server may proceed to process the message and commit the data in the message into the data of the blockchain. In some situations, the particular blockchain system may perform various checks prior to committing the data, such as waiting until a consensus among other blockchain servers has been reached. These checks establish a shared set of conditions (such as ensuring sufficient balance of the cryptocurrency sender) and are outside the scope of the signature itself.

A cryptographic system is generally deemed to be secure only so long as the secrets that are used as inputs to the cryptographic functions are maintained in secret. For example, Alice may use a private key value known only to her to produce signatures for her cryptocurrency. If Alices' private key value (which is usually a very large, random number) is ever compromised, such as through physical or electronic theft, carelessness, and so forth, an adversary could then use that private key value to generate authentic digital signatures. If this key were associated with cryptocurrency balances on one or more networks, signing transactions to move those cryptocurrencies would be both authentic and valid. As a result, the adversary could perform actions as if they were Alice, including stealing the cryptocurrencies associated with her private key.

Cryptographic data may be exchanged on a conditional basis, such that if a first party does something a second party will reciprocate by doing something else. For example, Alice may have stored a first private asset key that represents 1 ether (ETH) on the Ethereum blockchain. Bob may have stored a second private asset key that represents a particular nonfungible token (NFT). Alice may wish to trade her ETH for Bob's NFT. Traditionally such a conditional transaction was prone to various forms of counterparty risk. For example, if Alice transfers her ETH first, Bob may not honor their agreement to transfer his NFT to Alice. Likewise, if Bob transfers his NFT first, Alice may not honor their agreement to transfer her ETH to Bob.

Traditional techniques for resolving this situation involved a third party. For example, Alice and Bob may both transfer their respective private asset keys to an escrow agent. The escrow agent, now holding the assets from the two parties, confirms the transfers and compliance with the terms of the agreement, and then finally transfers the respective assets to their new owners. However, this introduces additional transactions, complexity, cost, delays, and the potential for error or theft on the part of the third party.

Another traditional approach is a "smart contract" comprising code that is deployed across a specified blockchain. Given specific inputs to the smart contract, responsive to those inputs, the smart contract will produce a specified output. However, the smart contract relies on an external system to operate (such as the specified blockchain), does not remove the issues associated with the escrow agent, and may introduce other issues.

Described in this disclosure are techniques and systems for facilitating peer-to-peer secure conditional transfer of cryptographic data between two parties. These techniques may be used to conditionally transfer cryptographic data including, but not limited to, cryptocurrency, private keys, NFTs, and so forth with a high degree of certainty that both parties will perform. The techniques are implemented using secure devices of the participants that operate to enforce the conditionality of transfer. The process involves various steps that include a first device of a first party (1P) sending to a second device of a second party (2P) a proposal that describes the cryptographic data to be transferred and conditions of that transfer. If the 2P agrees, additional information is added to the first proposal to create second proposal data that is then digitally signed by the 2P. The signed second proposal data is sent to the first device. After confirming the signed second proposal data is consistent with the original proposal, the first device establishes a secure channel with the second device. This establishment also includes each device attesting their compliance with a common authority, such as the manufacturer or administrator of the system. This attestation provides high confidence that any subsequent transaction will be processed as expected. The first device then sends first transfer data that includes first cryptographic data, such as a first asset private key. The second device receives the first transfer data, determines its validity and consistency with the second proposal data, and then determines second transfer data to the first device. Because of the attestation, these and other actions associated with processing are highly likely to occur. The second transfer data includes second cryptographic data, such as a second asset private key. From the standpoint of the participating devices and as enforced by the operation of those devices, a transfer is completed once transfer data has been processed. Transmission of that transfer data to another device may occur later. For example, as part of the composition by the first device of the first transfer data, the underlying first asset private key is deleted from the first device. Continuing the example, composition by the second device of the second transfer data, responsive to the receipt of the first transfer data, results in the second device deleting the underlying second asset private key form the second device. Additional operations, such as transmitting the first transfer data to the second device or the second transfer data to the first device may be done at another time. For example, sending a message based on the transfer data to commit a change to a blockchain server may occur at another time.

The system and associated process substantially reduces or eliminates the incentive for parties to not reciprocate. For example, the sending of the second transfer data from the second device may be automatic responsive to receipt of valid first transfer data.

The system uses various techniques to prevent replay attacks, provide fault tolerance, and so forth. For example, information about a respective proposal may be maintained with a secure computing environment (SCE) until the associated transaction has been completed. As described above, once completed, the SCE deletes this information, preventing a replay. For example, when the second device receives the signed first transfer data from the first device, the second device may store the first asset private key only after sending the second asset private key to the first device. This removes economic incentive for second device to not to send assets to the first device, because of the enforcement provided by the attestation. This substantially reduces the risk of an exchange implementing this system to a griefing attack.

In the event of non-performance, information about the non-performing party may be published to a third-party system, such as a reputation system. Information about the reputation of a party may then be affected by the performance or non-performance of a transaction, providing information to other possible parties in the future as well as encouraging non-performing parties to perform. For example, if communication between the first device and the second device is interrupted before the second transfer data is sent, the 2P has the first asset private key and the 1P has not yet received the second asset private key. The 1P may publish the signed second proposal data to the reputation system. The 2P may then re-send the second transfer data to the 1P, or may publish the second transfer data to the reputation system. The 1P may retrieve the second transfer data at their convenience and complete the transaction.

In some implementations, participants may check with the reputation system before a transaction. For example, before sending a proposal, the 1P may check to confirm that the 2P has a good reputation for reciprocating. In another example, the 2P may check the reputation of the 1P before accepting the proposal.

In some implementations, the system may support pledging to allow transfers to be backed by collateral. Individual transfers may be limited to be less than or equal to a specified limit corresponding to the pledge. The collateral may then be used to make parties to a failed or partially completed transaction whole after some provable period of non-performance by their counterparty. For example, if the first device has sent the first transfer data to the second device, but the second device has failed to send the second transfer data to the first device, after a specified period of time has elapsed, at least a portion of the collateral may be transferred to the first device.

The examples herein may describe one-for-one transfers for ease of illustration, and not necessarily as a limitation. The system and techniques described herein support transfer of any quantity of cryptographic data from one party to another, and vice versa. For example, Alice may transfer 3 ETH to Bob for a specific NFT, Alice may transfer 2 ETH to Bob for the specific NFT and 1 bitcoin (BTC), Alice may transfer 1 BTC to Bob for 3TH and a second specific NFT, and so forth.

By using the techniques described in this disclosure, parties are able to conduct conditional transactions with a high degree of confidence in overall completion, substantially reducing counterparty risk. The system may operate to transfer cryptographic data without invoking an external system, such as a blockchain server. Once a transfer has been completed between the two parties, the transferred cryptographic data may be used. For example, the transferred private keys may be used to sign messages that are sent to respective blockchains.

Illustrative System

FIG. 1 depicts a system 100 that provides peer-to-peer secure conditional transfer of cryptographic data, according to one implementation. This figure shows the system at a first time t=1 before transfer of cryptographic data and a second time t=2 after transfer of cryptographic data.

A first party, such as a first user 102(1) "Alice" has a first smart card 104(1). Cryptographic data 110 may be stored within secure encrypted memory of a device such as a smart card 104, smartphone, or other device. For example, the smart card 104 may comprise secure encrypted memory that is secured using a physically unclonable function (PUF) that is inherent to the smart card 104. The smart card 104 is discussed in more detail with regard to FIG. 2.

The cryptographic data 110 may comprise one or more of an asset private key 114, asset metadata 116, asset public key 118, or other data. The asset private key 114 may comprise a cryptographic key value used to one or more of encrypt or decrypt data. For example, the asset private key 114 may be a symmetric key value of a symmetric encryption protocol, a private key of a public key infrastructure (PKI) encryption protocol, and so forth. The asset metadata 116 may comprise other information that is associated with the asset private key 114. In some implementations, the first cryptographic data 110 may include an asset private key 114. For example, if a PKI system is in use, the asset public key 118 may comprise is a public key that is associated with the asset private key 114.

One or more secure devices 130 may be used to perform at least a portion of the operations described in this disclosure. The secure device 130 may comprise one or more input/output (I/O) devices 132, interfaces to allow for communication with the smart card 104 or other device, and so forth. For example, the I/O devices 132 may comprise a touchscreen that allows for presentation of information on a display and acceptance of user input. The secure device 130 is discussed in more detail with regard to FIG. 2.

In this illustration, at time t=1 the first user 102(1) Alice has stored on her first smart card 104(1) the first cryptographic data 110(1) comprising a first asset private key 114(1). For example, the first asset private key 114(1) may be associated with a value of 1 ether (ETH) on the Ethereum blockchain.

For ease of illustration and not as a limitation, in the figures and examples discussed, key values are represented by a shorthand value. For example, the first asset private key 114(1) associated with the Ethereum blockchain may comprise a string 64 hexadecimal characters in length. In the following examples, this is notated instead as "<a_prv_key_1>". The first user 102(1) has connected the first smart card 104(1) to the first secure device 130(1).

Similarly at time t=1 the second user 102(2) "Bob" has stored on his second smart card 104(2) second cryptographic data 110(2) comprising a second asset private key 114(2). For example, the second asset private key 114(2) may be associated with a particular non-fungible token (NFT) that is designated as "BugsyNFT931". The second user 102(2) has connected his second smart card 104(2) to the second secure device 103(2).

The first secure device 130(1) and the second secure device 130(2) are in communication with one another. For example, one or more networks 150, such as the Internet, may provide communication between the first secure device 130(1) and the second secure device 130(2).

At time t=1, the first user 102(1) uses the first secure device 130(1) to prepare a first proposal for a conditional transfer of 1 ETH to Bob in return for Bob transferring the "BugsyNFT931" to Alice. The second user 102(2) uses the second secure device 130(2) to accept the proposal. The first secure device 130(1) and the second secure device 130(2) use the process described in more detail with regard to FIGS. 4-12 to provide the conditional transfer.

At time t=2, the conditional transfer has completed. The first user 102(1) Alice now has stored on her first smart card 104(1) the second cryptographic data 110(2) while the second user 102(2) Bob now has stored on his second smart card 104(2) the first cryptographic data 110(1).

Each party may then process or otherwise use their respective cryptographic data. For example, the first user 102(1) Alice may use the first secure device 130(1) to use the second asset private key 114(2) to sign a message that changes the blockchain address of the "BugsyNFT931" to Alice's address. This message may then be sent to one or more blockchain servers 160(1) associated with the NFT to produce an update to blockchain data 162(1) consistent with the signed message. Continuing the example, the second user 102(2) Bob may use the second secure device 130(2) to use the first asset private key 114(1) to sign a message that changes the address of the received 1 ETH to Bob's address. This message may then be sent to one or more blockchain servers 160(P) to produce an update to blockchain data 162(P), such as the Ethereum blockchain.

In some implementations one or more reputation servers 152 may be used. For example, the reputation servers 152 may receive information indicative of compliance with a signed proposal, failure to comply with a signed proposal, and so forth. For example, non-compliance may be published to provide notification to others of a particular user 102, smart card 104, secure device 130, or combination thereof that has been associated with failures to complete a conditional transfer. Use of the reputation servers 152 is discussed in more detail with regard to FIG. 6. In some implementations the reputation server(s) 152 may implement a blockchain.

In some implementations other servers (not shown) may be used. For example, one or more verification servers may store information indicative of signed conditional transfers, allowing for verification of a previous transaction. In some implementations the verification servers may implement a blockchain. In one implementation, the process of conditional transfer may produce verification data. In another implementation, a non-conditional transfer may be performed, and verification data may be produced.

The examples in this disclosure describe one-for-one transfers for ease of illustration, and not necessarily as a limitation. The system and techniques disclosed support transfer of any quantity of cryptographic data from one party to another, and vice versa. For example, Alice may transfer 3 ETH to Bob for a specific NFT, Alice may transfer 2 ETH to Bob for the specific NFT and 1 bitcoin (BTC), Alice may transfer 1 BTC to Bob for 3 ETH and a second specific NFT, and so forth.

While two secure devices 130(1) and 130(2) are depicted in these examples, in some implementations a single secure device 130 may be used. For example, the first user 102(1) and the second user 102(2) and their respective smart cards 104(1) and 104(2) may use the same secure device 130 to perform at least a portion of the conditional transfer.

As described below, in some implementations, one or more of the functions or hardware described may be consolidated into a single device. For example, a smartphone may include an embedded secure encrypted memory equivalent to the smart card 104, include a secure computing environment (SCE), and so forth.

Figure 2:
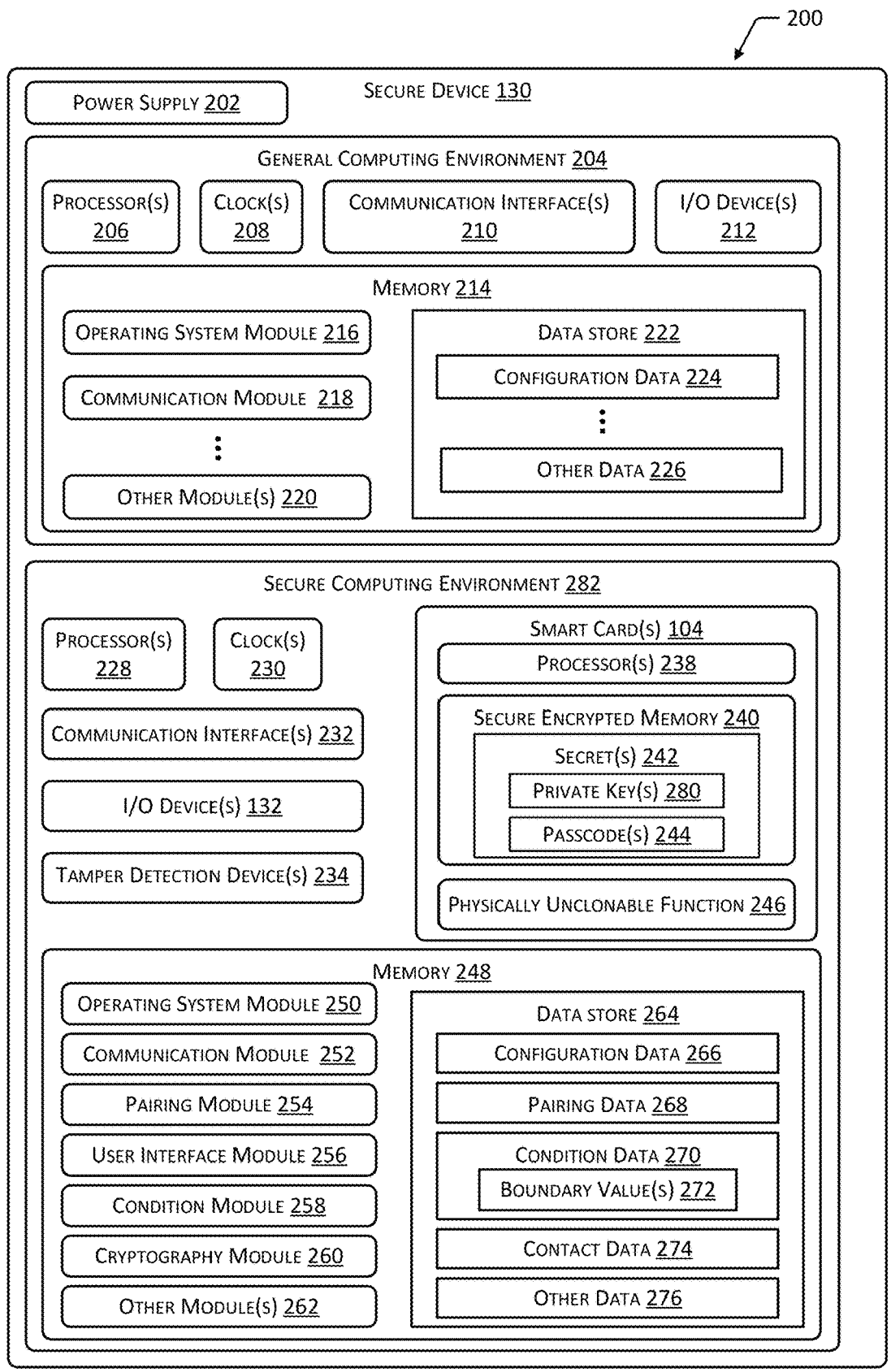
FIG. 2 illustrates a block diagram of the secure device, according to one implementation.

FIG. 2 illustrates a block diagram 200 of the secure device 130, according to one implementation.

The secure device 130 may include a power supply 202. For example, the power supply 202 may transform alternating current at a first voltage obtained from a household outlet to direct current at a second voltage. In some implementations other devices may be used to provide electrical power to the secure device 130. For example, power may be provided by wireless power transfer, batteries, photovoltaic cells, capacitors, fuel cells, and so forth.

The secure device 130 may comprise a general computing environment (GCE) 204. The GCE 204 may include one or more hardware processors 206 (processors) configured to execute one or more stored instructions. The processors 206 may comprise one or more cores. The processors 206 may include microcontrollers, systems on a chip, field programmable gate arrays, digital signal processors, graphic processing units, general processing units, and so forth. One or more clocks 208 may provide information indicative of date, time, ticks, and so forth.

The GCE 204 may include one or more communication interfaces 210. The communication interfaces 210 enable the GCE 204, or components thereof, to communicate with other devices or components. The communication interfaces 210 may include one or more of Inter-Integrated Circuit (I2C), Serial Peripheral Interface bus (SPI), Universal Serial Bus (USB) as promulgated by the USB Implementers Forum, RS-232, Ethernet, Wi-Fi, Bluetooth, Bluetooth Low Energy, ZigBee, or long term evolution (LTE), and so forth. For example, the GCE 204 may include a Wi-Fi interface that allows the secure device 130 to communicate with the network 150, a Zigbee interface that allows the secure device 130 to communicate with other devices, and so forth.

The GCE 204 may include one or more I/O devices 212. The I/O devices 212 may include input devices such as one or more of a switch, keyboard, or touch sensor, and so forth. The I/O devices 212 may also include output devices such as one or more of a light, speaker, or display, and so forth. In some embodiments, the I/O devices 212 may be physically incorporated within the secure device 130 or may be externally placed.

As shown in FIG. 2, the GCE 204 includes one or more memories 214. The memory 214 may comprise one or more non-transitory computer-readable storage media (CRSM). The CRSM may be any one or more of an electronic storage medium, a magnetic storage medium, an optical storage medium, a quantum storage medium, or a mechanical computer storage medium, and so forth. The memory 214 provides storage of computer-readable instructions, data structures, program modules, and other data for the operation of the GCE 204. A few example functional modules are shown stored in the memory 214, although the same functionality may alternatively be implemented in hardware, firmware, or as a system on a chip (SoC).

The memory 214 may include at least one operating system (OS) module 216. The OS module 216 is configured to manage hardware resource devices such as the communication interfaces 210, the I/O devices 212, and provide various services to applications or modules executing on the processors 206. For example, the OS module 216 may implement a variant of the Linux operating system, such as FreeBSD.

The memory 214 may store one or more of the following modules. These modules may be executed as foreground applications, background tasks, daemons, and so forth. For example, the memory 214 may store a communication module 218 and one or more other modules 220. The communication module 218 may be configured to use one or more of the communication interfaces 210 to facilitate communication between other devices and the SCE 282. For example, the communication module 218 may use a network interface to establish a connection to a WiFi wireless access point and exchange data with another secure device 130, blockchain servers 160, reputation servers 152, and so forth. The communication module 218 may facilitate communication between the SCE 282 and other devices. In some implementations the communication module 218 may provide for encrypted communications with the network interface. The OS module 216, the communication module 218, or other modules 220 may provide additional functions such as network security, denial of service, attack mitigation, port scanning detection, and so forth. In the event a potential attack is detected, the GCE 204 may take mitigating actions. For example, the GCE 204 may temporarily disconnect network access, acquire a new network address using a dynamic host configuration protocol, suspend communication with the SCE 282, and so forth.

Also stored in the memory 214 may be a data store 222. The data store 222 may use a flat file, database, linked list, tree, executable code, script, or other data structure to store information. The data store 222 may include configuration data 224. For example, the configuration data 224 may include connection parameters for the network interface. Other data 226 may also be stored in the memory 214.

The secure device 130 comprises an SCE 282. The SCE 282 may include one or more hardware processors 228 (processors) configured to execute one or more stored instructions. The processors 228 may comprise one or more cores. The processors 228 may include microcontrollers, systems on a chip, field programmable gate arrays, digital signal processors, graphic processing units, general processing units, and so forth. One or more clocks 230 may provide information indicative of date, time, ticks, and so forth.

The SCE 282 may include one or more communication interfaces 232. The communication interfaces 232 enable the SCE 282, or components thereof, to communicate with other devices or components. The communication interfaces 232 may include one or more of I2C, SPI, USB, RS-232, secure digital host controller (SDHC), smart card interface, or near-field communication (NFC) interface, and so forth. In some implementations, communication between the GCE 204 and the SCE 282 may be limited to a particular communication bus, such as SPI or USB.

The SCE 282 may include one or more I/O devices 132. The I/O devices 132 may include input devices such as one or more of a switch, keyboard, or touch sensor, and so forth. The I/O devices 132 may also include output devices such as one or more of a light, speaker, or display, and so forth. For example, the I/O devices 132 may include a touchscreen that incorporates a display and a touch sensor, allowing for the presentation of data and acquisition of input. These I/O devices 132 may be constrained such that they may only be accessed by the SCE 282, and not the GCE 204.

The SCE 282 provides security against algorithmic and physical forms of intrusion. For example, the separation between the GCE 204 and the SCE 282, as well as other attributes of the SCE 282, minimizes the likelihood of success of an algorithmic attack. To guard against physical attack, the SCE 282 may include, or be in communication with, one or more tamper detection devices 234.

The tamper detection devices 234 provide data indicative of actual or potential tampering with the SCE 282 or elements therein. For example, the tamper detection devices 234 may include switches that indicate that the case of the secure device 130 has been opened. In another example, the tamper detection devices 234 and circuitry may include electrical conductors that, when broken, signal physical tampering. In another example, the tamper detection devices 234 may include sensors. For example, temperature sensors, light sensors, voltage measurement devices, magnetic field sensors, ionizing radiation sensors, ultrasonic sensors, and so forth may provide data that is indicative of tampering. The tamper detection devices 234 may be used to detect tampering of components that are part of a single die, a circuit board, an assembly, the SCE 282, and so forth. For example, the I/O devices 132 may include tamper detection devices 234.

In some implementations, the SCE 282 or portions thereof may be configured to self-destruct or otherwise be rendered unusable responsive to tampering. For example, responsive to a determination of tampering, voltage exceeding a threshold value may be passed through at least a portion of the circuitry in the SCE 282, rendering the circuitry unusable. In another example, responsive to a determination of tampering, storage media may be erased, overwritten, randomized, and so forth.

The SCE 282 may include one or more smart cards 104. The smart card 104 may be integral with the SCE 282, may be removeable, or may be wirelessly connected. The smart card 104 may include one or more of a processor 238 or a secure encrypted memory 240. For example, the processor 238 may be configured to provide one or more cryptographic functions. The secure encrypted memory 240 may be used to store one or more secrets 242, such as private keys 280, passcode 244 values, and so forth. The private keys 280 may include the asset private keys 114. In some implementations the secrets 242 may include the cryptographic data 110.

Communication with the smart card 104 may be established using one or more electrical contacts, or wirelessly using electromagnetic radiation, magnetic fields, sound, and so forth. For example, the communication interfaces 232 may include an interface that requires electrical contact with the smart card 104 and is compliant with at least a portion of the International Organization for Standards (ISO) and International Electrotechnical Commission (IEC) ISO/IEC 7816 standard. In another example, the communication interfaces 232 may include a wireless interface that is compliant with at least a portion of the ISO/IEC 14443.

The smart card 104 may also include a physically unclonable function (PUF) 246. The PUF 246 may be based on some characteristic of the smart card 104 or a component therein that exhibits physical variation during fabrication. The PUF 246 may be used to produce data that is unique to that particular smart card 104, but is considered stable with respect to a specified range of environmental conditions. Physical variable features such as the distribution of coatings, arrangement of a crystalline lattice, arrangement of magnetic particles, and so forth may be used to generate the PUF 246. In some implementations, the PUF 246 may be used as a private key 280, or as random seed to generate a private key 280.

As shown in FIG. 2, the SCE 282 includes one or more memories 248. The memory 248 may comprise one or more CRSM. As described above, the CRSM may be any one or more of an electronic storage medium, a magnetic storage medium, an optical storage medium, a quantum storage medium, or a mechanical computer storage medium, and so forth. The memory 248 provides storage of computer-readable instructions, data structures, program modules, and other data for the operation of the SCE 282. A few example functional modules are shown stored in the memory 248, although the same functionality may alternatively be implemented in hardware, firmware, or as a system on a chip (SoC).

The memory 248 may include at least one operating system (OS) module 250. The OS module 250 is configured to manage hardware resource devices such as the communication interfaces 232, the I/O devices 132, and provide various services to applications or modules executing on the processors 228. For example, the OS module 250 may implement a variant of the Linux operating system, such as Free BSD.

The memory 248 may store one or more of the following modules. These modules may be executed as foreground applications, background tasks, daemons, and so forth. These modules may include one or more of a pairing module 254, a user interface module 256, a condition module 258, a cryptography module 260, or other modules 262.

Also stored in the memory 214 may be a data store 264. The data store 264 may use a flat file, database, linked list, tree, executable code, script, or other data structure to store information. The data store 264 may include one or more of configuration data 266, pairing data 268, condition data 270, boundary values 272, contact data 274, or other data 276. For example, the configuration data 266 may comprise settings associated with operation of the OS module 250, data indicative of the limits imposed by the communication module 252, and so forth.

The communication module 252 may use one or more of the communication interfaces 232 to provide communication between the SCE 282 and the GCE 204. The communication module 252 may implement mailbox functionality, restricting the type of data that may be transferred between the SCE 282 and the GCE 204. The communication module 252 may restrict communication based on frequency of data transfer, size of the data, type of data being transferred, implement a limited set of instructions, and so forth. For example, if the communication module 252 receives message data from the GCE 204 that is too large, the communication module 252 may erase the message data. In another example, the communication module 252 may suspend communications when a number of messages per unit time exceeds a threshold value. In some implementations, if the communication module 252 or other module detects activity that exceeds one or more thresholds, mitigating actions may be taken. These mitigating actions may include, but are not limited to, erasure of the secure encrypted memory 240, rendering one or more components of the SCE 282 inoperable, and so forth. For example, if the number of invalid instructions processed by the communication module 252 exceeds a threshold count within a predetermined period of time, the secure encrypted memory 240 may be erased. Likewise, the communication module 252 may impose limits on outbound communication to the GCE 204.

The pairing module 254 may generate or update the pairing data 268. Pairing indicates an established and trusted relationship between the secure device 130 and another device or system. The other device may be another secure device 130. The pairing module 254 may be configured to participate in a pairing process. For example, the communication module 252 may receive message data from the GCE 204 that comprises data associated with pairing, such as a source identifier, a source address, a public key, and so forth. The communication module 252 passes the message data to the pairing module 254 for processing. The pairing module 254 may implement one or more techniques for pairing. For example, the pairing module 254 may utilize a Diffie-Hellman key exchange.

The user interface module 256 may present a user interface via the I/O devices 132 in the SCE 282. For example, the user interface module 256 may accept user input from an I/O device 132 to generate proposal data and send that proposal data to another party. In some implementations, the proposal data may be generated in the GCE 204 and sent to the SCE 282. Operations that involve digitally signing or otherwise manipulating cryptographic data 110 may be performed within the SCE 282.

The user interface module 256 may present other user interfaces to perform other operations, such as pairing with another device, confirming transfer, and so forth.

During operation, some data may be transferred over the network 150, with the GCE 204 providing communication to the SCE 282 of the secure device 130. For example, the first SCE 282(1) of the first secure device 130(1) may use the communication capabilities of the first GCE 204(1) to establish communication with the second GCE 204(2) that transfers data to the second SCE 282(2) of the second secure device 130(2).

The condition module 258 may be used to assess incoming message data. The condition module 258 may assess values of the incoming message data against one or more of the pairing data 268 or the condition data 270 and corresponding boundary values 272.

In some implementations, the condition module 258 may be configured to disregard all message data that is not associated with a paired device as indicated in the pairing data 268. For example, a paired device sends message data to the secure device 130 for signing. In another example, the condition module 258 may disregard traffic from devices other than those specified in proposal data that has been previously sent. The condition module 258 checks a source address, signature data, or other values in the message data to determine if the message data is associated with pairing data 268 indicative of a pairing that is still in force.

Each pairing, as indicated in the pairing data 268, may have one or more different rules or conditions associated with that pairing. These conditions may specify limits designated by the user 102, administrator, and so forth.

Continuing the earlier example, after determining a valid pairing exists, the condition module 258 then compares one or more other values of the message data to determine if they satisfy one or more of the conditions specified in the condition data 270. The condition data 270 may indicate particular fields of data and the corresponding boundary values 272 for those fields. For example, the field may be "type of currency" and the boundary value 272 may be "ETH".

The condition data 270 may be used to specify one or more of a type of asset that is permitted, a type of transaction that is permitted, a maximum number of signed messages within a specified interval of time, a maximum quantity of assets in a single transaction, a minimum quantity of assets in a single transaction, or a maximum quantity of assets transferred per interval of time, and so forth. In other implementations, other conditions may be specified with corresponding boundary values 272.

The conditions specified by the condition data 270 may include a requirement for verification by the user 102 before the signed message data is determined. For example, the user interface module 256 may be used to accept input from the user 102 indicative of approval to sign the message data. In one implementation, the input provided by the user 102 may comprise a passcode 244 that, when entered using the I/O device 132 and subsequently validated, is used to access one or more of the private keys 280. For example, the passcode 244 may be used to authorize or otherwise indicate use of a "blind" private key 280. In another implementation, instead of or in addition to the passcode 244, a removeable smart card 104 may be required. With this implementation, the SCE 282 utilizes the removeable smart card 104 as a form of second factor authentication.

The cryptography module 260 performs one or more cryptographic functions. These cryptographic functions may include, but are not limited to, private key generation, creation of one or more pieces of a private key 280 for sharing, hierarchically deterministic address generation, digital signing, hash generation, multiple signature signing, encryption, decryption, and so forth. For example, the cryptographic functions may include an implementation of secret sharing, such as described by Adi Shamir, George Blakely, and so forth, that allows for a secret 242 to be divided into several pieces that may then be distributed. The private key 280 may then be determined using the pieces, or a subset of those pieces. In another example, the cryptographic functions may produce, based on one or more of the private keys 280, a digital signature that is used to create the signed message data.

In some implementations, one or more of the cryptographic functions may be performed at least in part by the smart card 104. For example, a cryptographic processor on the smart card 104 may be used to generate a signature.

The memory 248 may store contact data 274. The contact data 274 comprises information about one or more participants or contacts that may be parties to a transaction involving the secure device 130. For example, the contact data 274 may comprise information such as the names and cryptocurrency addresses, pictures, and so forth of friends, family, vendors, and so forth that the user 102 wants to transfer assets to.

Public key values, cryptocurrency addresses, and other data associated with transactions involving cryptography can be troublesome for the user 102 to deal with. Humans may have difficulty working with long sequences of letters and numbers. For example, humans may have difficulty discerning small differences between those strings, remembering a cryptocurrency address, and so forth. As a result, there is the potential for the user 102 to incorrectly select one cryptocurrency address when another is intended, or otherwise introduce errors into the process of generating the signed message data.

The user interface module 256 may be used to provide, with the I/O devices 132, at least a portion of the contact data 274 that is associated with the message data. In one implementation, the user interface module 256 may use the destination address in the message data to retrieve a particular record from the contact data 274. For example, if the message data is a payment transaction that includes the destination address which matches an entry in the contact data 274 associated with "Bob", the name in the contact data 274 and a previously stored picture of "Bob" will be shown on the display. In some situations, the user 102 may be prompted to provide an approval to the transaction, enter a passcode 244, and so forth. By presenting this information in the user interface, the user 102 is quickly and easily able to see who the recipient is of that transaction. This facilitates discovery of unwanted or incorrect transactions being signed. As a result, overall security of the system is improved.

The other modules 262 may provide other functions. For example responsive to proposal data being input or received, a reputation checker may query a reputation server 152 for information associated with the proposal data. The resulting information, or information based thereon, may be presented to the user 102 using the one or more I/O devices 132.

In one implementation, the SCE 282 may comprise the Kinetis K81 microcontroller unit (MCU) from NXP Semiconductors N.V. of Eindhoven, the Netherlands. In other implementations, the SCE 282 may comprise other devices.

Figure 3:
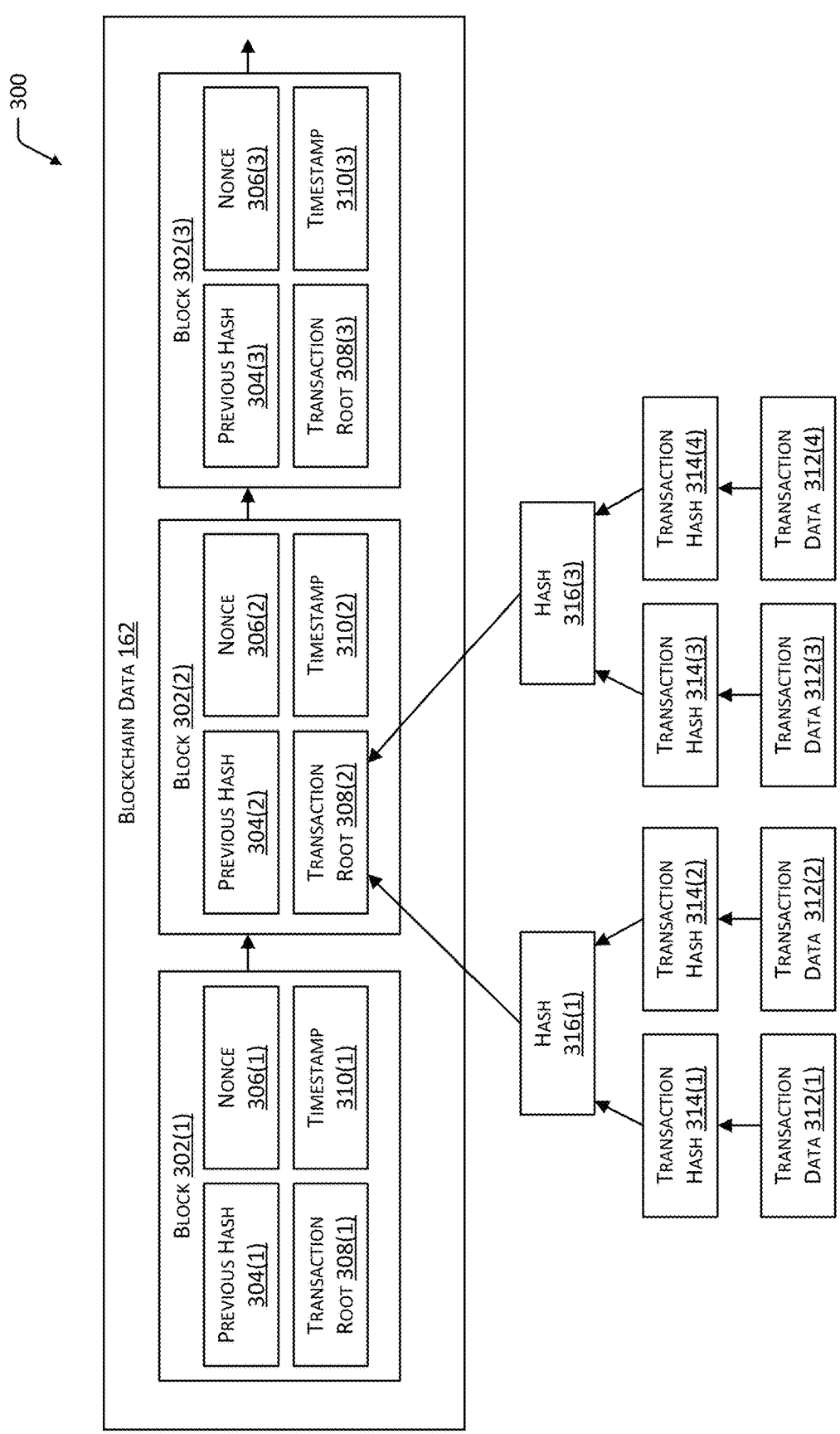
FIG. 3 illustrates blockchain data, according to one implementation.

FIG. 3 illustrates a portion 300 of blockchain data 162, according to one implementation. The techniques described in this disclosure allow for the transfer of digital assets, such as involving a blockchain, to be transferred "off chain", that is, without interacting with the blockchain system until after the transfer, if at all.

A distributed ledger or blockchain comprises a system that utilizes a network of peers that provide distributed data storage and processing of blockchain data 162 that provides a canonical record. The blockchain data 162 maintains information about a current state as well as how that current state was arrived at.

To maintain a deterministic state at all times, data is recorded into the database in blocks 302(1), 302(2), 302(3), . . . , 302(B). Each block 302 comprises a block header that includes a previous hash 304, a nonce 306, a transaction root 308, and a timestamp 310. The block 302 may include payload data, such as details of a transaction, contract parameters, and so forth. In some implementations, the block 302 may include other data that facilitates proof and verification of the transactions which are contained in that block 302 as well as the precedence of the existence of that block 302 relative to other blocks 302 in the blockchain data 162. Blocks 302 are linked together over time by recording the previous hash 304 of the previous block 302 in the subsequent block 302. For example, block 302(2) includes the previous hash 304(2) that is derived from the data in the block 302(1). The previous hash 304 of a given block 302 may be constructed of a hash of data contained in the block 302 as well as a nonce 306 which forms a block hash which meets the requirements of consensus of the given blockchain.

Transaction data 312 is hashed to produce a transaction hash 314. A plurality of transaction hashes 314 may then be hashed again in a deterministic way with one another, such as using a Merkle tree, to form a hash 316, until they are all represented by a single hash 316 which is stored as the transaction root 308. The hashing process allows the verification of the existence of all transaction data 312 in a block 302 because the transaction data 312 can be shown to be part of the transaction root 308 recorded in the block header in the block 302. In some implementations, the transaction data 312 may include a message cryptographically signed by the current owner of an asset transferring the asset to another address. For example, the user 102 may use the secure device 130 to create, based on the cryptographic data 110 such as the asset private key 114, signed message data that is then used as transaction data 312 which is subsequently committed to the blockchain data 162.

The ownership of assets recorded by the blockchain data 162 is determined by the ability of a participant to cryptographically sign a message which moves assets from a first account to a second account. The ability to create the signed message data which will be honored by the blockchain servers 160 may be predicated on the ability to sign the message data with a private key 280 that corresponds to a source account or an address of the assets.

Continuing the example from FIG. 1, after time t=2, the first user 102(1) Alice may send signed message data to the NFT blockchain servers 160(1) to change the account associated with that asset to Alice. Likewise, the second user 102(2) Bob may send signed message data to the Ethereum blockchain servers 160(P) to change the account associated with that asset to Bob.

Figure 4:
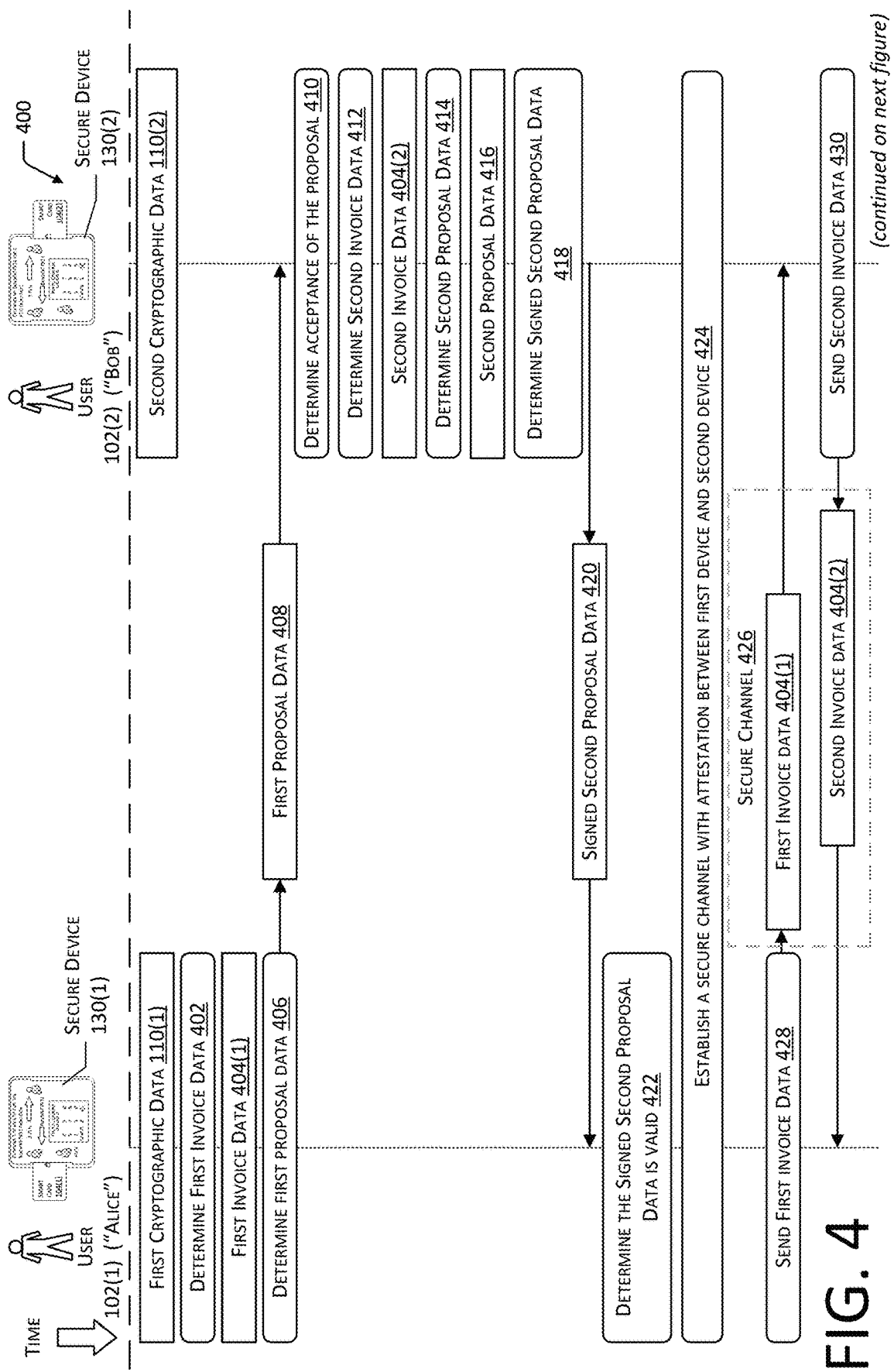
FIGS. 4-5 illustrate flow diagrams of a process for peer-to-peer secure conditional transfer of cryptographic data, according to one implementation.
Figure 5:
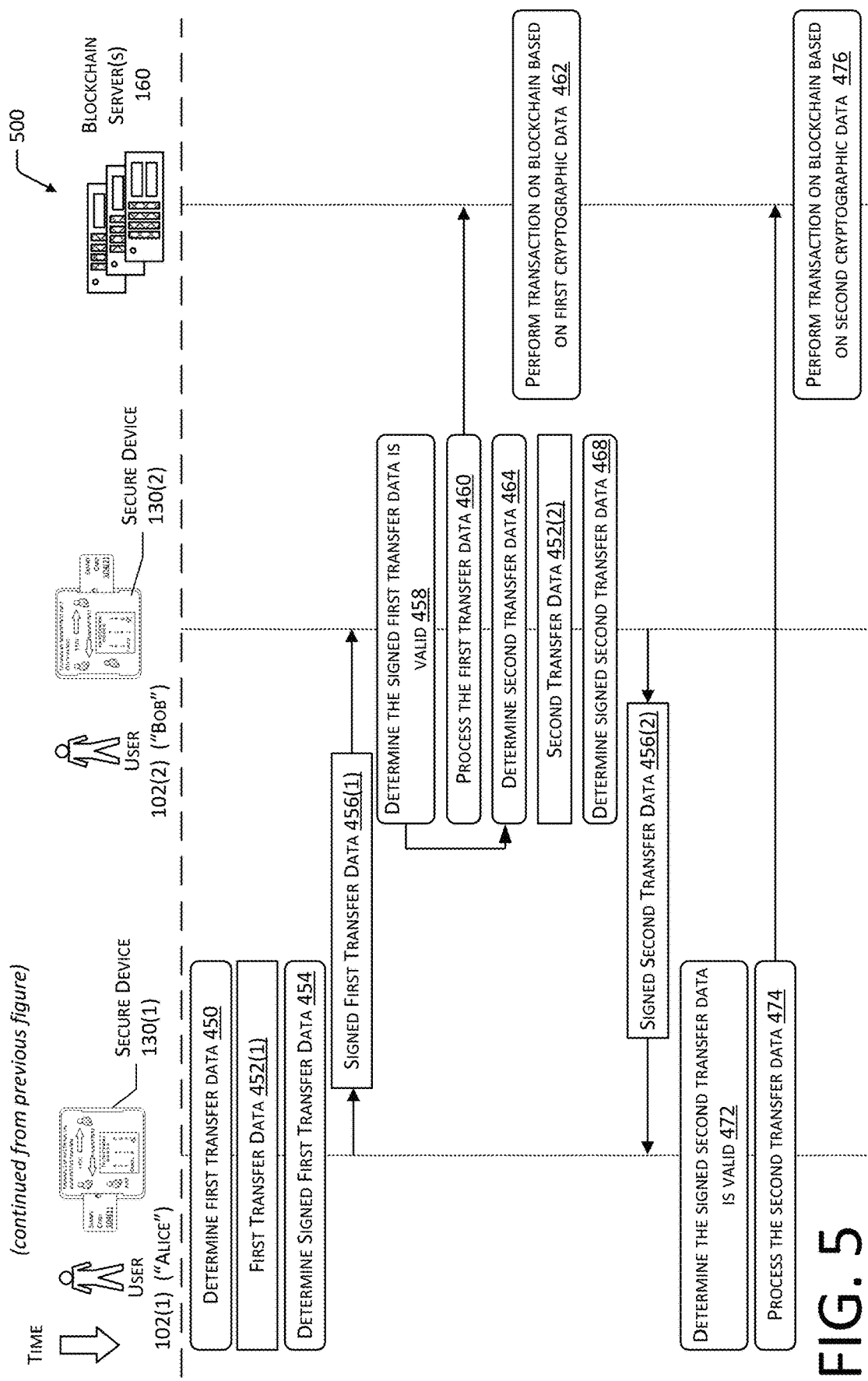

FIGS. 4-5 illustrate flow diagrams 400 and 500 of a process for peer-to-peer secure conditional transfer of cryptographic data, according to one implementation. In these diagrams, time increases generally downward with respect to the page, such that operations depicted at the top of the page may occur before operations depicted at the bottom of the page. However, the order in which some operations are performed may vary. One implementation of order of operations is depicted in the following figures, but other orders of operation are possible. Additional description of the data mentioned in FIGS. 4-5 may be found in FIGS. 8-12. The operations associated with the blockchain servers 160 may be performed at a different time from the other operations discussed in this disclosure.

A first party (1P) user 102(1) Alice is shown, using the first secure device 130(1) and the first smart card 104(1). The first cryptographic data 110(1) is stored on the first smart card 104(1).

A second party (2P) user 102(2) Bob is shown, using the second secure device 130(2) and the second smart card 104(2). The second cryptographic data 110(2) is stored on the second smart card 104(2).

At 402, the first secure device 130(1) determines first invoice data 404(1). The invoice data 404 may comprise an invoice identifier (ID) and an invoice key. The invoice ID may comprise a nonce value. The invoice key may comprise a different nonce value. In one implementation, the processor 238 of the smart card 104 may generate the invoice ID 836 and the invoice key 838. The first invoice data 404(1) is indicative of a first invoice ID 836(1) and a first invoice key 838(1).

At 406 the first secure device 130(1) determines first proposal data 408. For example, the first proposal data 408 may be determined responsive to input received from the first user 102(1) using the one or more I/O devices 132. The first proposal data 408 may comprise information such as the public keys of the assets to be transferred, the invoice ID 836, and so forth. For example, the first proposal data 408 may comprise a (1P) first asset public key 118(1) that indicates the asset(s) to be provided by the 1P, (2P) second asset public key 118(2) that indicates the asset(s) to be provided by the 2P, a (1P) device public key of the first smart card 104(1), data indicative of conditions of transfer, and so forth.

In some implementations the first proposal data 408 may be digitally signed. For example, a first device private key associated with the first smart card 104(1) may be used to sign the first proposal data 408.

The first proposal data 408 is sent to the second secure device 130(2) that is associated with the first proposal data 408. The first proposal data 408 is received by the second secure device 130(2).

In some implementations, one or more assessments may be made with respect to the reputation servers 152 to determine historical data indicative of prior performance of one or more parties. For example, before sending the first proposal data 408, the 1P may query the reputation servers 152, the blockchain servers 160, and so forth. If the historical data is deemed to indicate a possibility of failure that is greater than the party's preference, the transaction may be canceled. For example, if the 1P received historical data indicating that the 2P has failed to reciprocate 4% of their transactions, the 1P may deem the risk of non-reciprocation as too great, and not send the first proposal data 408.

In one implementation, the second asset public key may be sent to a third device such as the reputation server 152. Responsive to this, the third device may return historical data that is indicative of one or more prior transfers of the second asset public key, whether those transfers were successful, and so forth.

In another implementation, the second device public key may be sent to the third device such as the reputation server 152. Responsive to this, the third device may return historical data that is indicative of one or more prior transfers associated with the second device public key, whether those transfers were successful, if there are pending incomplete transfers, and so forth. Likewise, in other implementations, other keys or information may be used to request historical data.

At 410 the second secure device 130(2) determines acceptance of the proposal specified by the first proposal data 408. For example, information indicative of the first proposal data 408 may be presented by the I/O device(s) 132 of the second secure device 130(2). The acceptance may be responsive to a user input, such as entry of a passcode 244 or other data via the I/O device(s) 132.

Similarly to that described above with respect to the 1P, in some implementations the 2P may make one or more assessments based on historical data obtained from the reputation servers 152 to determine whether to proceed.

At 412 the second secure device 130(2) determines second invoice data 404(2). In some implementations the second invoice data 404(2) may be determined responsive to the acceptance. The second invoice data 404(2) may comprise a second invoice ID 836(2) and a second invoice key 838(2). The first invoice ID 836(1) differs from the second invoice ID 836(2), while the second invoice key 838(2) differs from the first invoice key 838(1).

At 414 the second secure device 130(2) determines second proposal data 416. In one implementation, the second proposal data 416 may comprise hashes of the public keys of the private keys to be transferred. In one implementation, a separate hash may be determined for each public key. The second proposal data 416 may also include device public keys 804 of the devices involved in the transfer. For example, the device public keys 804 may comprise the public keys associated with the smart cards 104. The second proposal data 416 may also include both the first invoice ID 836(1) and the second invoice ID 836(2). The second proposal data is discussed with regard to FIG. 11.

At 418 the second secure device 130(2) digitally signs the second proposal data 416 to determine signed second proposal data 420. For example, the second proposal data 416 may be digitally signed using a private key 280 of the second smart card 104(2), using the processor 238 of the second smart card 104(2). The digital signing may comprise determining a hash of the data to be signed, such as the second proposal data 416, and digitally signing the hash of the data to be signed.

The signed second proposal data 420 is sent from the second secure device 130(2) to the first secure device 130(1).

At 422 the first secure computing device 130(1) determines that the signed second proposal data 420 is valid. For example, the digital signature may be validated using a device public key associated with the second smart card 104(2). The digital signature provides assurance that the signed second proposal data 420 was processed by the second secure device 130(2). In some implementations, the validation of the signed second proposal data 420 may be performed by the SCE 282 or by the smart card 104.

The signed second proposal data 420 available at this point may later be used to facilitate completion of an incomplete conditional transfer by the 2P. This is discussed in more detail with regard to FIG. 6.

At 424 a secure channel 426 with attestation is established between the first secure device 130(1) and the second secure device 130(2). The attestation is provided by validating a public key provided by a participating secure device 130 has been signed by a common root certificate authority (CA), such as a manufacturer of the secure devices 130. Based on the attestation, the participating secure devices 130 can be assured as to the security of the system and associated processing. For example, an attested secure device 130 is relied upon as providing enforcement of processing rules for the system, such as data deletion, reciprocation pursuant to user input to proceed with processing a valid proposal, and so forth.

In some implementations, the secure channel 426 may be between the first SCE 282 or the first smart card 104(1) and the second SCE 282 or the second smart card 104(2). In one implementation, the secure channel may be established using an elliptic-curve Diffie-Hellman (ECDH) protocol. During the establishment of the secure channel 426, one or more of the invoice key(s) 838 or a portion thereof may be determined and distributed between by the devices, such as the first smart card 104(1) of the first secure device 130(1) and the second smart card 104(2) of the second secure device 130(2).

In one implementation, the secure channel 426 may be established as illustrated in the following sequence example that illustrates smart card pairing in which a secure channel with attestation is established between the first smart card 104(1) of the first secure device 130(1) and the second smart card 104(2) of the second secure device 130(2):

```
First Smart Card 104(1)              Second Smart Card 104(2)
(e.g., Sender Card)                    (e.g. Receiver Card)
     :::: OPEN_CHANNEL ::::
<-------INIT_CARD_PAIRING---(receiverCertificate(receiverPub))
senderSalt := random( )
senderCert(senderPub), senderSalt)---->CARD_PAIR-------------->
                     receiverSalt := random( )
                     GRIDPLUS_CA_KEY.verify(senderCert)
                     ecdhSec := ECDH(senderPub, receiverPriv)
               sessionKey := sha512(senderSalt | receiverSalt | ecdhSec)
                     (encryptKey, macKey) := split(sessionKey)
                           aesIV := random( )
                  channel := new_channel(encryptKey, macKey, aesIV)
          receiverSig := receiverPriv.sign(sha256(sessionKey | aesIV))
<-----------CARD_PAIR_2<--(receiverSalt, aesIV, receiverSig)
GRIDPLUS_CA_KEY.verify(receiverCert)
ecdhSec := ECDH(receiverPub, senderPriv)
sessionKey := sha512(senderSalt | receiverSalt | ecdhSec)
receiverPub.verify(receiverSig, sha256(sessionKey | aesIV))
senderSig := senderSig.sign(sha256(sessionKey | aesIV))
(encryptKey, macKey) := split(sessionKey)
channel := new_channel(encryptKey, macKey, aesIV)
(senderSig)------------> FINALIZE_CARD_PAIRING------------->
               senderPub.verify(senderSig, sha256(sessionKey | aesIV))
(Secure channel is established)<-----------------( )
```

Sequence Example 1

In some implementations, the encryption initialization vector 954 may comprise the "aesIV" value while the invoice key 838 may comprise the "sessionKey" value, as exchanged in Sequence Example 1. The aesIV may comprise an initialization vector (or initialization value) compliant with the Advanced Encryption Standard (AES).

In some implementations, such as where a plurality of transfers are expected, instead of a single encryption initialization vector 954 being transferred, a plurality may be transferred, such in an array. For example, if ten transfers are expected, an array comprising ten different encryption initialization vectors 954 may be used.

At 428, using the secure channel 426, at least a portion of the first invoice data 404(1) is sent to the 2P. At 430, using the secure channel 426, at least a portion of the second invoice data 404(2) is sent to the 1P. For example, the first invoice data 404(1) including the first invoice key 838(1) is sent to the second smart card 104(2), while the second invoice data 404(2) including the second invoice key 838(2) is sent to the first smart card 104(1). In some implementations the first invoice key 838(1) and the second invoice key 838(1) may be the same.

FIG. 5 continues at 500 the process of FIG. 4. At 450 the first secure device 130(1) determines first transfer data 452(1). For example, responsive to the signed second proposal data 420, the transfer of the invoice data 404, and acceptance by the first user 102(1) as indicated via input to the I/O device 132 of the first secure device 130(1), the SCE 282(1) of the first secure device 130(1) determines the first transfer data 452(1).

The first transfer data 452(1) may comprise the first invoice ID 836(1), (1P) asset public key hash 912(1) as included in the signed second proposal data 420, a second proposal data hash 914 comprising a hash of at least a portion of the second proposal data 416, and encrypted data 950 that includes the first cryptographic data 110(1). In some implementations other has values may be included. The first transfer data 452(1) is discussed with regard to FIG. 9.

At 454 the first secure device 130(1) digitally signs the first transfer data 452(1) using the first device private key to determine signed first transfer data 456(1). For example, the first smart card 104(1) uses the processor 238(1) and the first device private key 280 of the first smart card 104(1) to generate the digital signature of the first transfer data 452(1). The digital signing may comprise determining a hash of the data to be signed, such as the first transfer data 452(1), and digitally signing the hash of the data to be signed.

The first secure device 130(1) sends the signed first transfer data 456(1) to the second secure device 130(2). The second secure device 130(2) then receives the signed first transfer data 456(1).

At 458 the second secure device 130(2) determines the signed first transfer data 456(1) is valid. For example, the digital signature may be validated using a first device public key associated with the first smart card 104(1). The digital signature provides assurance that the signed first transfer data 456(1) was processed by the first secure device 130(1). In some implementations, the validation of the signed first transfer data 456(1) may be performed by the SCE 282 or by the smart card 104 of the second secure device 130(2).

The determination of validity may also include checking one or more hash values of the first transfer data 452(1). For example, the first transfer data 452(1) also includes a second proposal data hash 914. By confirming that the second proposal hash data 914 in the first transfer data 452(1) matches that included in the second proposal data 416, there is an assurance that the first transfer data 452(1) is responsive to the previously sent second proposal data 416 and has not been modified.

Once the signed first transfer data 456(1) is deemed valid, the second invoice ID 836(2) that is stored by the second secure device 130(2) is deleted. For example, the second invoice ID 836(2) may be deleted from the secure encrypted memory 240(2) of the second smart card 104(2). This deletion, occurring within the second secure device 130(2), prevents a replay of the first transfer data 452(1) and double receipt of the same digital asset. The process then proceeds to 464 automatically.

At 460 the second secure device 130(2) processes the first transfer data 452(1). This operation may be performed after 464 in some implementations. For example, the second secure device 130(2) may generate a signed message using the first asset private key 114(1) included in the first cryptographic data 110(1). The signed message may then be sent to the blockchain server(s) 160 at this time or at a later time. At 462, responsive to the signed message that is based on the first cryptographic data 110(1), the blockchain server 160 performs a transaction on the blockchain data 162. For example, the blockchain server 160 may commit to the blockchain data 162 a change in owner of the 1 ETH that was transferred to the second user 102(2) based on the signed message.

At 464 the second secure device 130(2) determines second transfer data 452(2). For example, responsive to the validation at 458 of the signed first transfer data 456(1) and input from the second user 102(2) as indicated via input to the I/O device 132 of the second secure device 130(2), the SCE 282(2) of the first secure device 130(2) determines the second transfer data 452(2).

In some implementations, the determination of the second transfer data 452(2) may proceed based on the previous authorization the second user 102(2) provided during signing of the second proposal data 416 and occur before or after the processing the first transfer data 460. In this implementation, determination that the first transfer data 452(1) is validly signed may result in the second secure device 130(2) determining the second transfer data 452(2) without further intervention from the second user 102(2), given the previously received authorization to accept the proposed transfer. This behavior may be expected to be enforced in the system 100 based on the attestation associated with the establishment of the secure channel at 424. For example, the signed first transfer data 456(1) is received, at 458 this is determined to be validly signed, the second transfer data may be determined 464, signed second transfer data is determined 468, and sent to the first secure device 130(1). This process occurs without further user intervention, and provides enforcement and assurance that the transaction will be completed according to the previously approved proposal.

In some implementations, at 468 the second secure device 130(2) digitally signs the second transfer data 452(2) using the second device private key to determine signed second transfer data 456(2). For example, the second smart card 104(2) uses the processor 238(2) and the second device private key 280 of the second smart card 104(2) to generate the digital signature of the second transfer data 452(2). The digital signing may comprise determining a hash of the data to be signed, such as the second transfer data 452(2), and digitally signing the hash of the data to be signed.

The second transfer data 452(2) may comprise the second invoice ID 836(2), (1P) asset public key hash 912(1) as included in the signed second proposal data 420, (2P) asset public key hash 912(2), a second proposal data hash 914 of at least a portion of the second proposal data 416, and encrypted data 950(2) that includes the second cryptographic data 110(2). The signed second transfer data 456(2) is discussed with regard to FIG. 12.

The second secure device 130(2) sends the signed second transfer data 456(2) to the first secure device 130(1). The first secure device 130(1) then receives the signed second transfer data 456(2).

In other implementations, the digital signing of the second transfer data 452(2) may be omitted, with only the second transfer data 452(2) being sent to the first secure device 130(1).

At 472 the first secure computing device 130(1) determines the signed second transfer data 456(2) is valid. For example, the digital signature may be validated using a second device public key associated with the second smart card 104(2). In one implementation the second transfer data 452(2) may be sent without signing. In this implementation, the ability to successfully decrypt the encrypted data 950(2) may be deemed indicative of validity of the second transfer data 452(2). In some implementations, the validation of the signed second transfer data 456(2) may be performed by the SCE 282 or by the smart card 104 of the first secure device 130(1).

The determination of validity may also include checking one or more hash values of the second transfer data 452(2). For example, the second transfer data 452(2) also includes the second proposal data hash 914. By confirming that the second proposal data hash 914 in the second transfer data 452(2) matches that included in the second proposal data 416, there is an assurance that the second transfer data 452(2) is responsive to the previously sent second proposal data 416 and has not been modified.

Once the second transfer data 452(2) is deemed valid, the first invoice ID 836(1) that is stored by the first secure device 130(1) is deleted. For example, the first invoice ID 836(1) may be deleted from the secure encrypted memory 240(1) of the first smart card 104(1). This deletion, occurring within the first secure device 130(1), prevents a replay of the second transfer data 452(2) and double receipt of the same digital asset.

At 474 the first secure computing device 130(1) processes the second transfer data 452(2). For example, the first secure device 130(1) may generate a signed message using the second asset private key 114(2) included in the second cryptographic data 110(2). The signed message may then be sent to the blockchain server(s) 160 at this time or at a later time. At 476, responsive to the signed message that is based on the second cryptographic data 110(2), the blockchain server 160 performs a transaction on the blockchain data 162. For example, the blockchain server 160 may commit to the blockchain data 162 a change in owner of the "BugsyNFT931" to the first user 102(1) based on the signed message.

As mentioned above, in other implementations, other orders of operations may be utilized. For example, the second invoice data 404(2) may be sent before the first invoice data 404(1). In another example, the roles of the 1P and the 2P and their associated operations may be exchanged. For example, in one implementation, the determination of the first transfer data 450 may be performed by the second secure device 130(2), while the determination of the second transfer data 464 may be performed by the first secure computing device 130(1). In such situations, the various data transferred would be updated accordingly. In another example, the second secure device 130(2) may send the second transfer data 452(2) before the first transfer data 452(1) is received from the first secure device 130(1).

Figure 6:
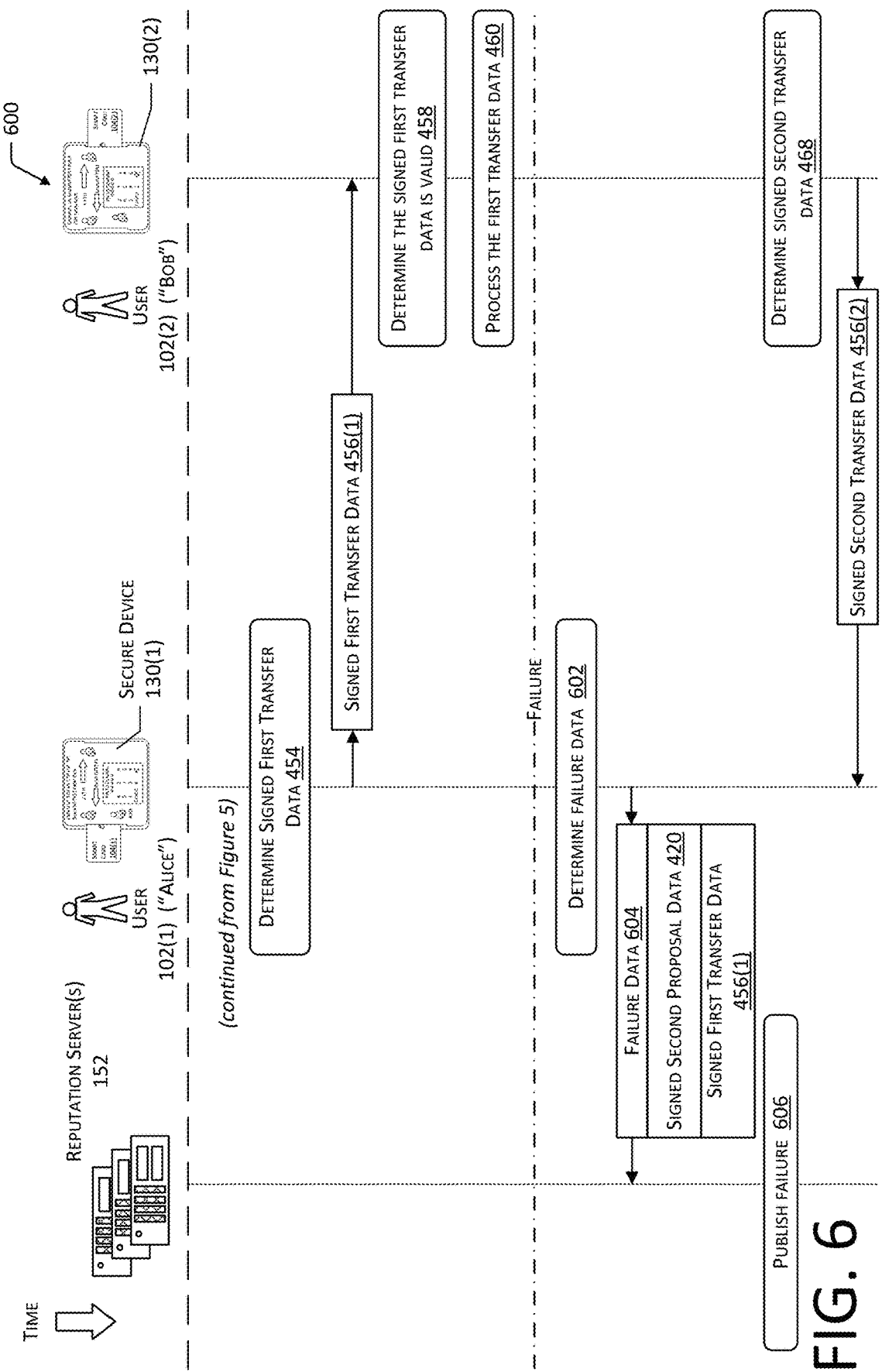
FIG. 6 illustrates a flow diagram of a process to address a failure of a conditional transfer, according to one implementation.

FIG. 6 illustrates a flow diagram 600 of a process to address a failure of a conditional transfer, according to one implementation. As described with regard to FIG. 5, at 454 the first secure device 130(1) digitally signs the first transfer data 452(1) using the first device private key to determine signed first transfer data 456(1). The first secure device 130(1) sends the signed first transfer data 456(1) to the second secure device 130(2). At 458 the second secure device 130(2) determines the signed first transfer data 456(1) is valid. At 460 the second secure device 130(2) processes the first transfer data 452(1).

A failure at this point may result in the conditional transaction being unreciprocated at this time. For example, a failure of the network 150, intentional disconnection, or other circumstances could prevent the second secure device 130(2) from responding with the second transfer data 452(2) or the signed second transfer data 456(2). At this point, the first cryptographic data 110(1) has been transferred from the 1P to the 2P, but the second cryptographic data 110(2) has not yet been transferred from the 2P to the 1P.

At 602, the first secure device 130(1) determines failure data 604 indicative of the failure to receive the expected second transfer data 452(2) or signed second transfer data 456(2). This failure data 604 and other information such as one or more of the signed second proposal data 420 (or a portion thereof), or the signed first transfer data 456(1) may be sent to a third device, such as the reputation server(s) 152. For example, the reputation server(s) 152 may be sent the signed first transfer data 456(1) that includes the second proposal data hash 914.

The reputation server 152 may publish the failure, and information such as the signed second proposal data 420, the signed first transfer data 456(1), and so forth. Because the cryptographic data 110 therein is encrypted, publication does not result in disclosure of those private keys 280 contained within. Publication of the signed second proposal data 420, signed using the second device private key, combined with the information contained therein, provides proof that the 2P had agreed to the transaction. Similarly, publication of the signed first transfer data 456(1) provides proof of the 1P's compliance with the proposal, and provides an alternative process for completion of the transaction.

In some implementations, the reputation server(s) 152 may impose a cost, decrement a counter, assess a gas fee, and so forth for publication of each failure. This may mitigate or eliminate inappropriate use of the reputation server 152 by submitting malicious failure data 604 in an attempt to subvert the reputation of a participating party.

Continuing the example, the 2P user 102(2) Bob receives an alert from the reputation server 152 that there was a failure of his portion of the conditional transaction. Responsive to this, he determines that the signed first transfer data 456(1) was not received by the second secure device 130(2), perhaps due to a momentary failure of the network 150. The 2P user 102(2) may retrieve the signed first transfer data 456(1) from the reputation server 152. The signed first transfer data 456(1) may then be validated by the second secure device 130(2). Responsive to this, at 468 the signed second transfer data 456(2) may be determined and provided to the first secure device 130(1) to complete the conditional transfer or the reputation server 152. If the signed second transfer data 456(2) is provided to the reputation server 152, the 1P first user 102(1) may retrieve and process the signed second transfer data 456(2) at a later time.

In other situations, the failure data 602 may be determined by the 2P. For example, after a specified timeout interval has expired, the second secure device 130(2) may publish to the reputation servers 152 the signed second proposal data 420 to convey their desire to move forward with the conditional transfer. In implementations where the first proposal data 408 has been digitally signed to determine signed first proposal data, the signed first proposal data may be published as well to prove the intent of the 1P that proposed the conditional transfer.

The failure data 604 provided by one or more of the 1P or the 2P may be indicative of other failures. For example, conditions such as an invalid digital signature, a failed hash match, failure to decrypt encrypted data in transfer data, and so forth may also be reported.

In some implementations, success data (not shown) may be reported upon successful completion of a conditional transfer. For example, upon confirmation of receipt of transfer data, a party may publish data to the reputation server 152 indicative of success. In another example, upon confirmation of transfers being committed to their responsive blockchain data 162, the reputation server 152 may store data indicative of the completed transaction.

The reputation server(s) 152 may provide historical data that is indicative of one or more prior transfers. The historical data may be associated with one or more of the public keys involved in the transaction. In some implementations the reputation server(s) 152 may maintain a score or rating that is indicative of historical performance. If the reputation score associated with some part of the transaction is deemed to indicate a possibility of failure that is greater than the party's preference, the transaction may be canceled.

Figure 7:
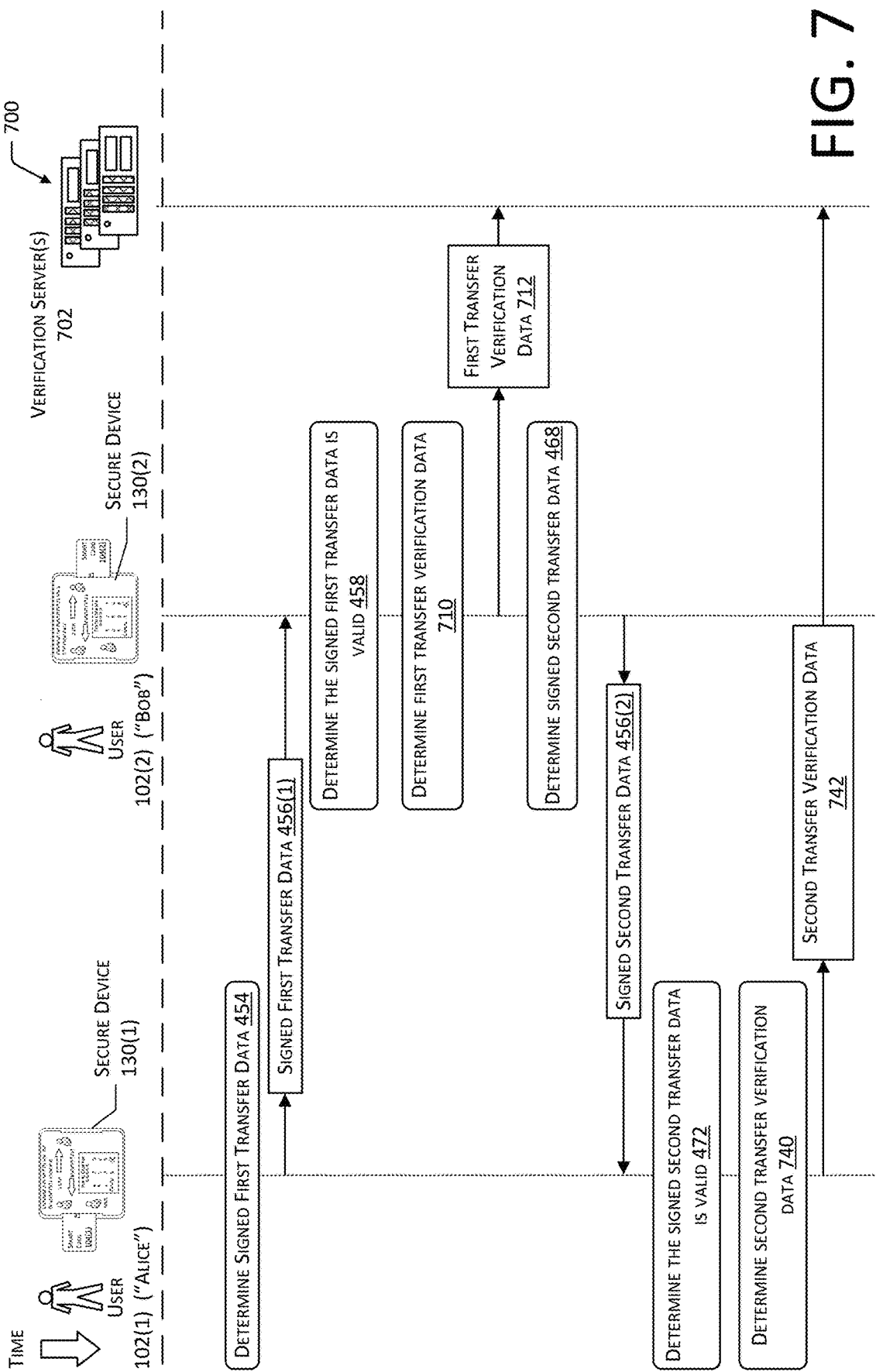
FIG. 7 illustrates a flow diagram of a process to provide verifiable transfer, according to one implementation.

FIG. 7 illustrates a flow diagram 700 of a process to provide verifiable transfer, according to one implementation. As described next, the system 100 may also be used to provide verification of a transfer, independent of a conditional transfer. For example, the 1P and the 2P may specify a conditional transfer, but wish to provide a record of the completed transactions.

At described above, at 454 signed first transfer data 456(1) is determined and sent from the first secure device 130(1) to the second secure device 130(2). At 458 the second secure device 130(2) determines the signed first transfer data 456(1) is valid.

At 710 the second secure device 130(2) determines first transfer verification data 712. The first transfer verification data 712 is sent to one or more other devices, such as a verification server 702, the first secure device 130(1), and so forth. In some implementations, the verification server 702 may implement a blockchain. The first transfer verification data 712 may comprise information indicative of the signed first transfer data 456(1) received by the second secure device 130(2). For example, the signed first transfer data 456(1) may be hashed, and the hash may be digitally signed using the second device private key of the second smart card 104(2) of the second secure device 130(2). The first transfer verification data 712 may comprise this signed hash.

Returning to FIG. 7, at 468 signed second transfer data 456(2) is determined and sent to the first secure device 130(1). At 472 the first secure computing device 130(1) determines the signed second transfer data 456(2) is valid.

At 740 the first secure device 130(1) determines second transfer verification data 742. The second transfer verification data 742 is sent to one or more other devices, such as the verification server 702, the second secure device 130(2), and so forth. The second transfer verification data 742 may comprise information indicative of the signed first transfer data 456(1) received by the second secure device 130(2). For example, the signed second transfer data 456(2) may be hashed, and the hash may be digitally signed using the first device private key of the first smart card 104(1) of the first secure device 130(1). The second transfer verification data 742 may comprise this signed hash.

In another implementation not shown, the signed second transfer data 456(2) may be sent to both the first secure device 130(1) and the verification server 702.

FIGS. 8-12 illustrate block diagrams of data associated with operation of the system 100, according to one implementation.

Figure 8:
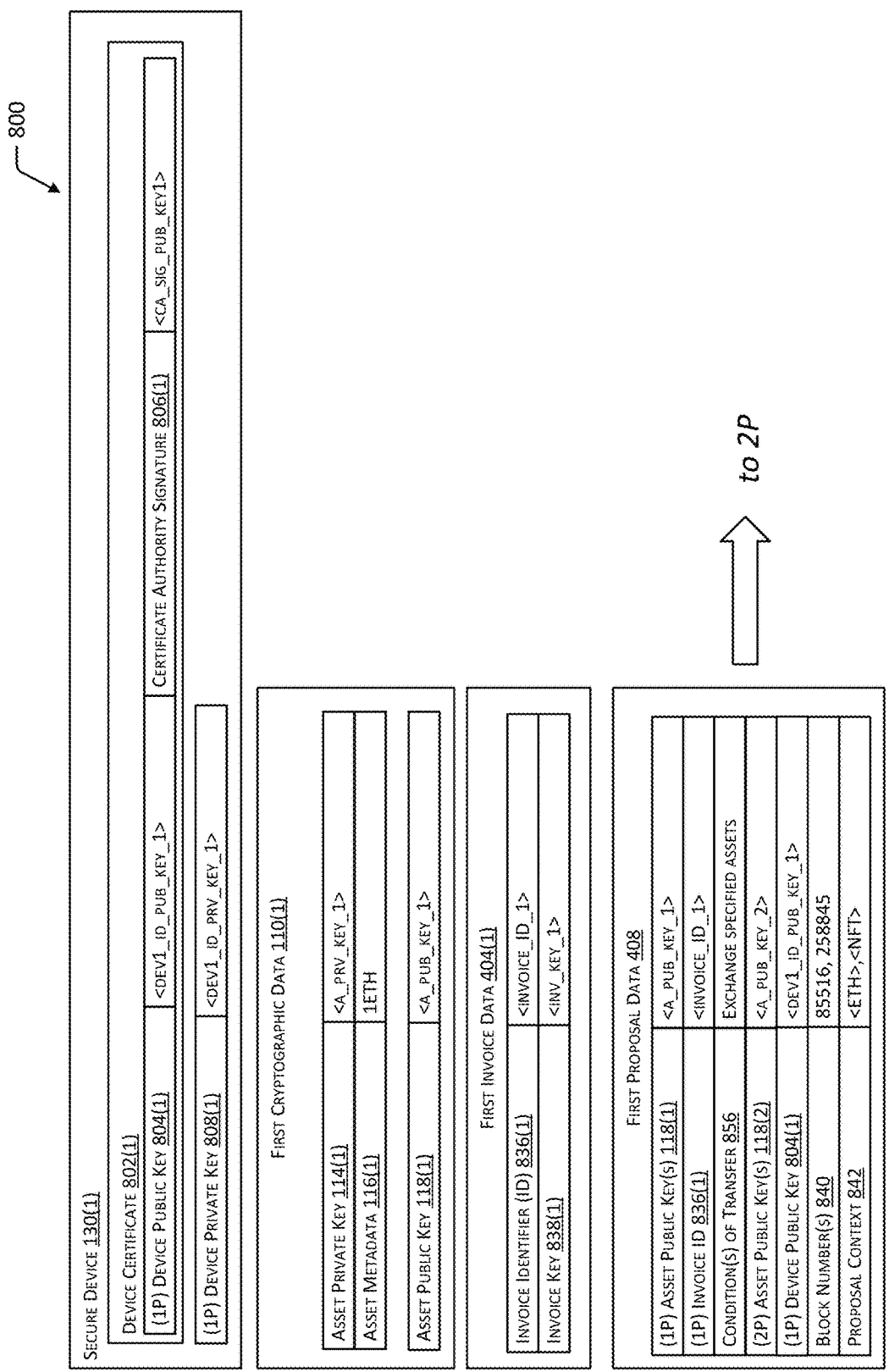

FIG. 8 depicts at 800 a block diagram of information associated with the 1P of a conditional transfer, including a first device certificate 802(1), first cryptographic data 110(1), first invoice data 404(1), and first proposal data 408, according to one implementation.

Stored within a secure device 130 may be a device certificate 802. In some implementations, the device certificate 802 may be stored within the secure encrypted memory 240 of the smart card 104. The device certificate 802 comprises a device public key 804, a certificate authority signature 806, and a device private key 808. The device public key 804 is associated with the device private key 808. The certificate authority signature 806 establishes that the secure device 130, smart card 104, or other device having a device certificate 802, is trusted by a certifying authority that issues the certificate authority signature 806. This provides assurance that participants in the conditional transfer are trusted.

In this illustration, the first secure device 130(1) is shown, with a first device certificate 802(1) comprising a (1P) device public key 804(1), a certificate authority signature 806(1), and a (1P) device private key 808(1).

Stored within a secure device 130 may be the cryptographic data 110. In some implementations, the cryptographic data 110 may be stored within the secure encrypted memory 240 of the smart card 104. The cryptographic data 110 may comprise an asset private key 114, asset metadata 116, and an asset public key 118. The asset private key 114 may comprise a cryptographic key value used to one or more of encrypt or decrypt data. For example, the asset private key 114 may be a symmetric key value of a symmetric encryption protocol, a private key of a public key infrastructure (PKI) encryption protocol, and so forth. In some implementations, the cryptographic data 110 may comprise an asset public key 118 that is associated with the asset private key 114.

In this illustration, the first cryptographic data 110(1) shown, comprising a first asset private key 114(1), first asset metadata 116(1), and a first asset public key 118(1). For example, the first cryptographic data 110(1) represents a first digital asset consisting of a private key that is associated with 1 ETH token.

Stored within a secure device 130 may be the invoice data 404. In some implementations, the invoice data 404 may be stored within the secure encrypted memory 240 of the smart card 104. The invoice data 404 may comprise an invoice identifier (ID) 836 and an invoice key 838. The invoice ID 836 specifies a particular transfer. The invoice key 838 may be used as a symmetric encryption key to produce the encrypted data within the transfer data that conveys the cryptographic data 110 from one secure device 130 to another. The encrypted data may be encrypted using the invoice key 838 as the encryption key and the associated invoice ID 836 as an initialization vector for the encryption. In other implementation, the initialization vector may be another value, such as transferred during establishment of the secure channel 424 or via the secure channel 426.

In this illustration, the first invoice data 404(1) comprises the first invoice ID 836(1) and the first invoice key 838(1).

Stored within a secure device 130 may be the first proposal data 408. In some implementations, the first proposal data 408 may be stored within the memory 214 of the GCE 204, or the secure encrypted memory 240 of the smart card 104. The first proposal data 408 specifies the assets to be transferred and the conditions of those transfers. The first proposal data 408 may comprise one or more of: the (1P) first asset public key 118(1), the (1P) first invoice ID 836(1), conditions of transfer 856, the (2P) second asset public key 118(2), or (1P) first device public key 804(1). The first proposal data 408 may also include one or more block number(s) 840. The block number 840 may specify a particular block within blockchain data 162. During operation, the block number 840 may be used to enforce a time limit, during which the proposal is deemed to be valid. For example, use of the block number 840 may be used to set an endpoint in time to enforce completion by a particular time or block number, or abandon and subsequently disregard the transaction. In some implementations, an expiration time may be specified, after which time the proposal will be deemed to expire. In this illustration a first block number "85516" associated with the "ETH" blockchain is shown, while a second block number "258845" associated with the "NFT" blockchain is shown. In other some implementations the block number(s) 840 may be omitted entirely, included for only one portion of the conditional transfer, or included for both portions of the conditional transfer. As indicated above, in some implementations the first proposal data 408 may be digitally signed, and that digital signature provided to the 2P.

The first proposal data 408 may also include proposal context 842. The proposal context data 842 may be indicative of a blockchain or other system that the proposal is associated with. For example, the proposal context 842 may comprise a blockhash. In other some implementations the proposal context 842 may be omitted entirely, included for only one portion of the conditional transfer, or included for both portions of the conditional transfer.

In this illustration, the first proposal data 408 specifies the public keys associated with the 1 ETH of the 1P first user 102(1) Alice and the NFT of the 2P second user 102(2) Bob, indicating an exchange of the specified assets. In other implementations other conditions may be specified. For example, the conditions of transfer may specify completion of another conditional transfer.

Pledged Transfers Using Collateral

In some implementations, the system 100 may support a guarantee for transfers pledged against collateral such as another asset up to a specified limit. For example, the system 100 may implement a "pledge" or "gild" system in which each instance of transfer data 452 is guaranteed with a pledge of another asset such as United States Dollars (USD). In some implementations, the pledge may be specific to a particular smart card 104. The transfer data 452 may include pledge information indicative of this pledged state. Responsive to the pledge information, in some implementations, a single transfer may be decomposed into a set of transfers, such that each individual transfer in the set has a value that is less than or equal to the pledged asset. For example, a sending party may pledge their transfers to a maximum value of $1000 USD. The transfers in the set of transfers may be processed serially, such that at any time the pending transaction(s) have a value of less than or equal to the pledged amount. In the event of a failure for one of the transfers, the receiving party may receive at least a portion of the pledged amount. In some implementation, a provable period of time may be required before transfer of the collateral. For example, a party may have to fail to perform for at least a specified period of time. Once that specified time has elapsed, the transfer of the collateral may be performed. In some implementations the pledging system may be implemented at least in part using one or more smart contracts. In other implementations, the asset backing the pledge may be data maintained by the reputation server(s) 152.

In another implementation of the pledging system, a charge may be assessed by a third party for the pledging. These charges may be used to mitigate losses of participants utilizing pledging. For example, if a pledged transfer fails and results in a loss of a digital asset by a participating user, the third party may transfer another digital asset to mitigate the losses of the participating user.

Figure 9:
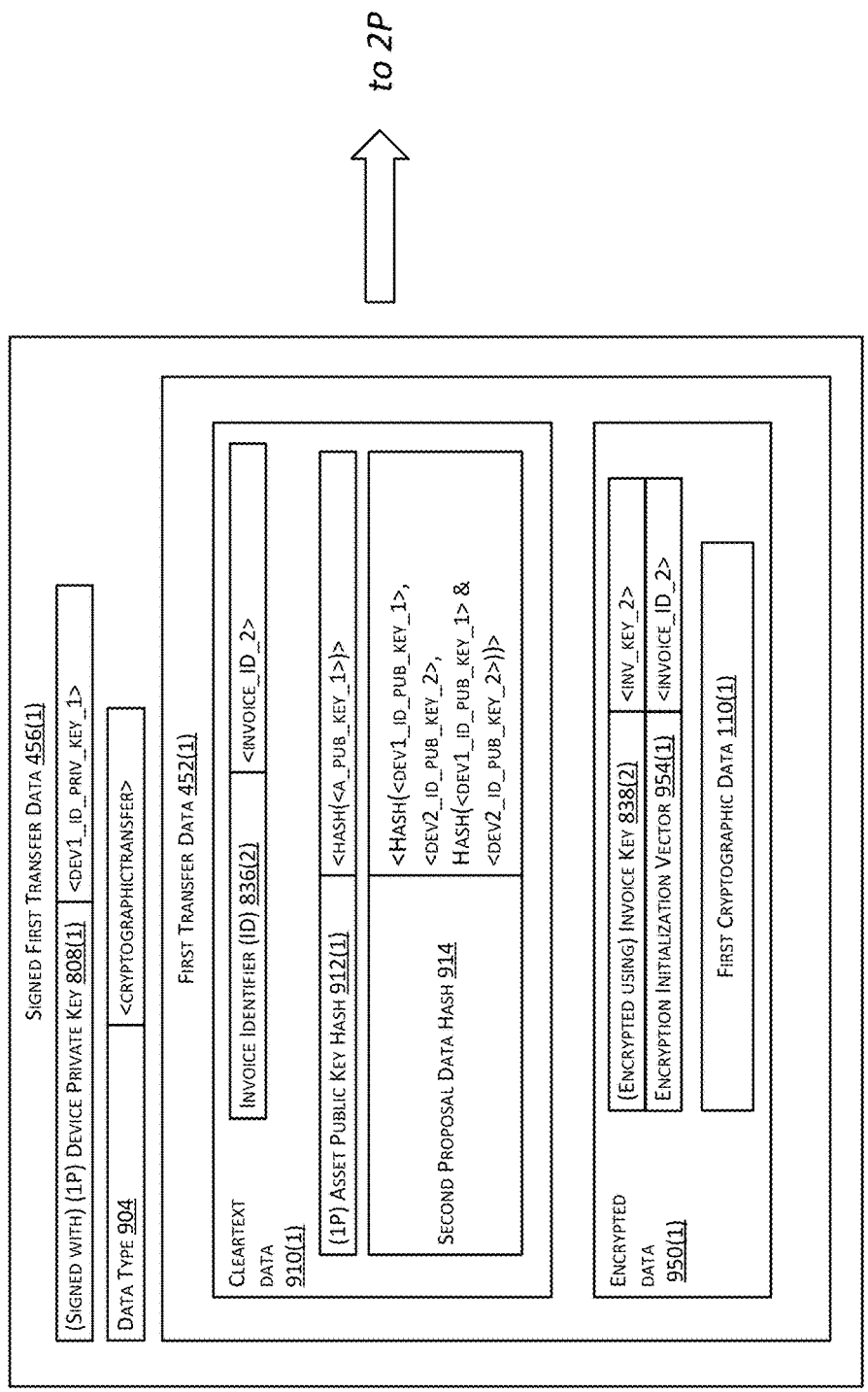

FIG. 9 depicts at 900 a block diagram of the signed first transfer data 456(1), according to one implementation. The signed first transfer data 456(1) comprises the first transfer data 452(1) that has been digitally signed. The digital signature may be generated by signing the first transfer data 452(1) with the (1P) device private key 808(1). The signed first transfer data 456(1) may comprise header information, such as a data type 904. The data type 904 may comprise data that is indicative of the contents of the signed first transfer data 456(1). For example, the data type 904 may indicate that the first transfer data 452(1) comprises transfer data that includes encrypted cryptographic data 110.

The transfer data 452 may comprise two portions: cleartext data 910 and encrypted data 950. The cleartext data 910 may comprise one or more of an invoice ID 836, an asset public key hash 912, or second proposal data hash 914. The asset public key hash 912 is determined by applying a hash function to the asset public key 118. In some implementations the asset public key hash 912 may be omitted.

The second proposal data hash 914 is determined by applying a hash function to the second proposal data 416 or a portion thereof. For example, the second proposal data hash 914 may comprise a hash of the (1P) device public key 804(1) and the (2P) device public key 804(2). In one implementation the second proposal data hash 914 may comprise a hash generated based on the following expression:

$$\text{Second Proposal Data Hash} = \text{Hash}(A, B, \text{Hash}(A, B))$$
where $A$ is the (1P) device public key 804(1) and
$B$ is the (2P) device public key 804(2)  (Expression 1)

In other implementations, the second proposal data hash 914 may comprise a hash of other data within or associated with the second proposal data 416.

While the first portion of the transfer data 452 is described as cleartext data 910, additional encryption may be applied to the transfer data 452. For example, the transfer data 452 may be encrypted before sending.

The encrypted data 950 may comprise the cryptographic data 110 that has been encrypted using the invoice key 838 that corresponds to the invoice ID 836 in the cleartext data 910. In some implementations, the invoice ID 836 may also be used as an encryption initialization vector 954 to generate the encrypted data 950.

In this illustration, the first transfer data 452(1) comprises first cleartext data 910(1) and first encrypted data 950(1). The first cleartext data 910(1) may comprise one or more of the second invoice ID 836(2) received from the 2P, the (1P)

first asset public key hash 912(1), or the second proposal data hash 914. The (1P) first asset public key hash 912(1) is determined by applying a hash function to the first asset public key 118(1). The first encrypted data 950(1) comprises the first cryptographic data 110(1) encrypted using the second invoice key 838(2). In another implementation the first encrypted data 950(1) may comprise the first cryptographic data 110(1) encrypted using the first invoice key 838(1), and the cleartext data 910(1) may comprise the first invoice ID 836(1).

Figure 10:
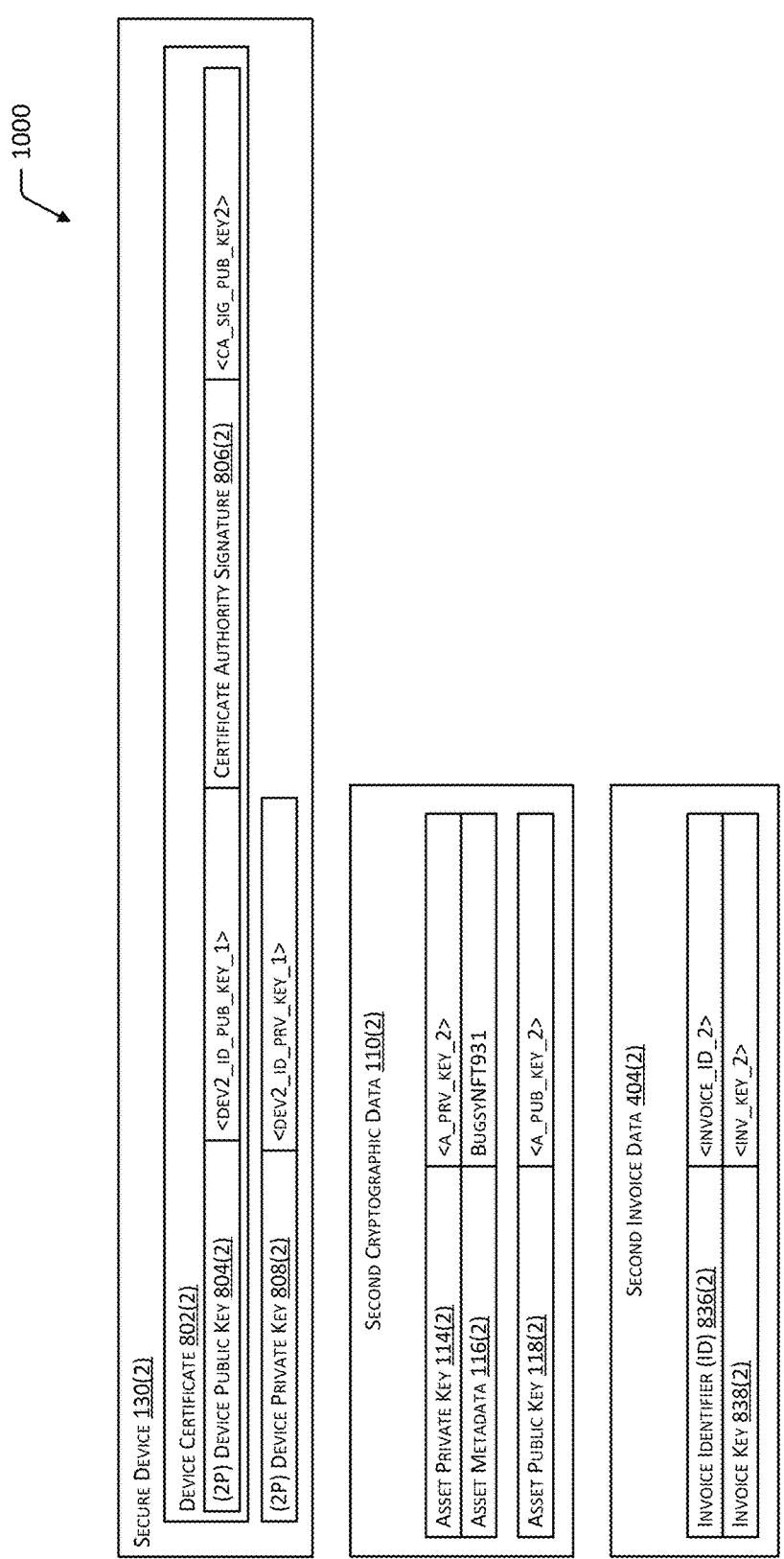

FIG. 10 depicts at 1000 a block diagram of information associated with the 2P of a conditional transfer, including a second device certificate 802(2), second cryptographic data 110(2), and second invoice data 404(2), according to one implementation.

In this illustration, the second secure device 130(2) is shown, with a second device certificate 802(2) comprising a (2P) device public key 804(2), a certificate authority signature 806(2), and a (2P) device private key 808(2).

In this illustration, the second cryptographic data 110(2) is shown, comprising a second asset private key 114(2), second asset metadata 116(2), and a second asset public key 118(2). For example, the second cryptographic data 110(2) represents a second digital asset consisting of a private key that is associated with the "BugsyNFT931" NFT.

In this illustration, the second invoice data 404(2) comprises the second invoice ID 836(2) and the second invoice key 838(2).

Figure 11:
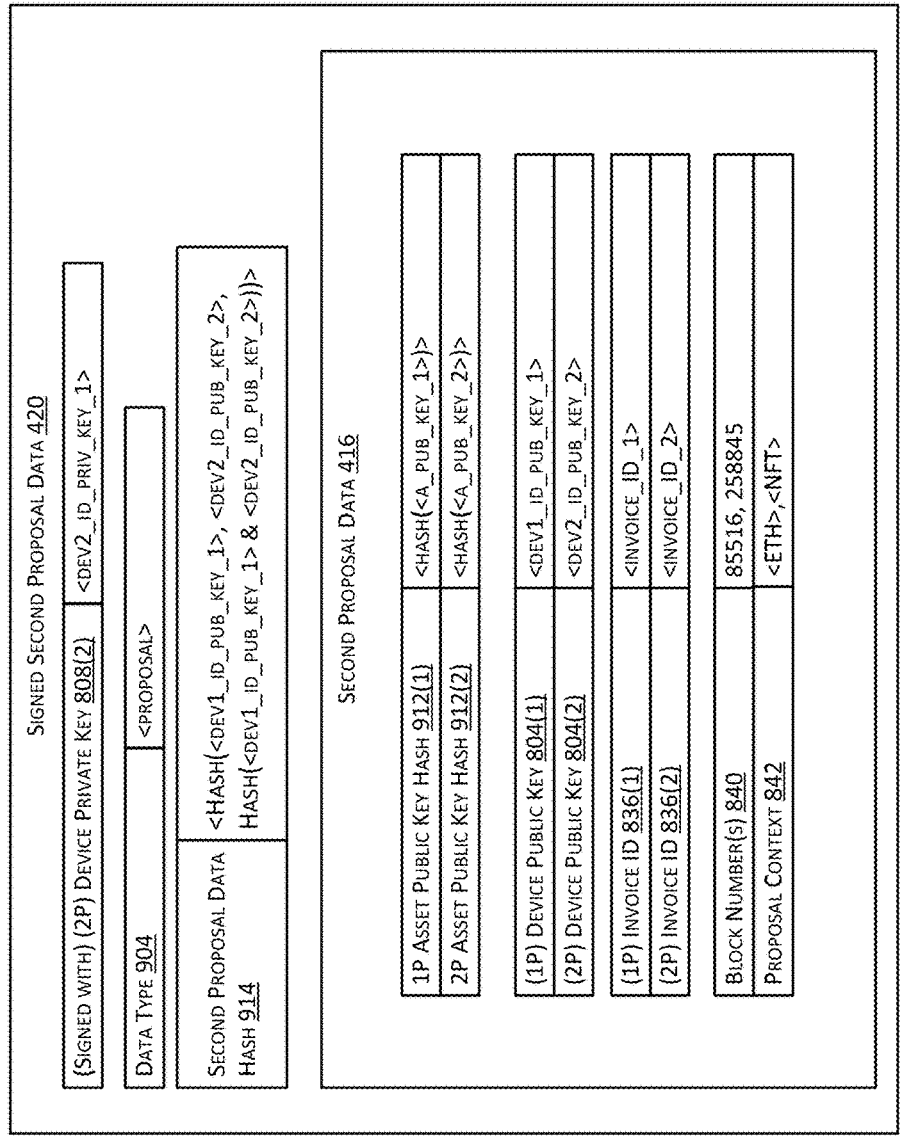

FIG. 11 depicts at 1100 a block diagram of the signed second proposal data 420.

The signed second proposal data 420 comprises the second proposal data 416 that has been digitally signed. The digital signature may be generated by signing the second proposal data 416 with the (2P) device private key 808(2). The signed second proposal data 420 may comprise header information, such as a data type 904. The data type 904 may comprise data that is indicative of the contents of the signed second proposal data 420. For example, the data type 904 may indicate that the second proposal data 416 comprises a response to an earlier proposal.

The second proposal data 416 is based on the first proposal data 408 and specifies the assets to be transferred. The second proposal data 416 may comprise one or more of: the (1P) first asset public key hash 912(1), a (2P) second asset public key hash 912(2), the second proposal data hash 914, the (1P) first device public key 804(1), the (2P) second device public key 804(2), the (1P) first invoice ID 836(1), or the (2P) second invoice ID 836(2).

The second proposal data hash 914 is determined by applying a hash function to the second proposal data 416 or a portion thereof. For example, the second proposal data hash 914 may comprise a hash of the (1P) device public key 804(1) and the (2P) device public key 804(2). In one implementation, the second proposal data hash 914 may comprise a hash generated based on Expression 1 as described above. In other implementations, the second proposal data hash 914 may comprise a hash of other data within or associated with the second proposal data 416.

In one implementation the second proposal data 416 may also include one or more of the block number(s) 840. The block number(s) 840 may specify a particular block within blockchain data 162. During operation, the block number 840 may be used to enforce a time limit, during which the proposal is deemed to be valid. For example, use of the block number 840 may be used to set an endpoint in time to enforce completion by a particular time or block number, or abandon and subsequently disregard the transaction. In some implementations, an expiration time may be specified, after which time the proposal will be deemed to expire.

In some implementations the second proposal data 416 may also include the proposal context 842.

In some implementations, the second proposal data 416 may include one or more of the conditions of transfer 856, or a hash of the conditions of transfer.

As indicated above, in some implementations the second proposal data 420 may be digitally signed, and that digital signature provided to the 1P as part of the signed second proposal data 420.

FIG. 12 depicts at 1200 a block diagram of the signed second transfer data 456(2), according to one implementation. The signed second transfer data 456(2) comprises the second transfer data 452(2) that has been digitally signed. The digital signature may be generated by signing the second transfer data 452(2) with the (2P) device private key 808(2). The signed second transfer data 456(2) may comprise header information, such as a data type 904. The data type 904 may comprise data that is indicative of the contents of the signed second transfer data 456(2). For example, the data type 904 may indicate that the second transfer data 452(2) comprises transfer data that includes encrypted cryptographic data 110.

In this illustration, the second transfer data 452(2) comprises second cleartext data 910(2) and second encrypted data 950(2). The second cleartext data 910(2) may comprise one or more of the first invoice ID 836(1) received from the 1P, the (2P) second asset public key hash 912(2), or the second proposal data hash 914. The (2P) second asset public key hash 912(2) is determined by applying a hash function to the second asset public key 118(2). The second encrypted data 950(2) comprises the second cryptographic data 110(2) encrypted using the first invoice key 838(1). In another implementation, the second encrypted data 950(2) may comprise the second cryptographic data 110(2) encrypted using the second invoice key 838(2), and the cleartext data 910(2) may comprise the second invoice ID 836(2).

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, or a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain modules, devices, software programs, processes, or entities, this need not be the case, and a variety of alternative implementations will be understood by those having ordinary skill in the art. For example, the functionality provided by one module may be incorporated into another.

Additionally, those having ordinary skill in the art will readily recognize that the system and techniques described above can be utilized in a variety of devices, environments, and situations.

Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first device comprising:
a first general computing environment comprising:
a first communication interface;
a first memory storing first computer-executable instructions; and
a first processor in communication with the first communication interface and the first memory, the first processor executing the first computer-executable instructions to:
receive, from a first secure computing environment, a first invoice identifier;
determine first proposal data comprising:
a first asset public key,
the first invoice identifier,
a second asset public key,
data indicative of a condition whereby a first asset private key is sent and a second asset private key is received, and
a first device public key;
send, using the first communication interface, the first proposal data to a second device;
receive, using the first communication interface, signed second proposal data comprising:
second proposal data indicative of acceptance of the first proposal data, and
a first digital signature of the second proposal data that is signed by the second device;
send the signed second proposal data to the first secure computing environment; and
send signed first transfer data to the second device using the first communication interface; and
the first secure computing environment comprising:
a first secure encrypted memory storing:
a first device private key, and
the first asset private key;
a second memory storing second computer-executable instructions; and
a second processor in communication with: the first processor, the first secure encrypted memory, and the second memory, the second processor executing the second computer-executable instructions to:
determine first invoice data comprising the first invoice identifier (ID) and a first invoice key;
determine the signed second proposal data is validly signed;
establish a secure channel with a second secure computing environment of the second device;
determine the first secure computing environment and the second secure computing environment are associated with a common authority;
send, using the secure channel, the first invoice data to the second device;
receive, using the secure channel, second invoice data, wherein the second invoice data comprises:
a second invoice identifier, and
a second invoice key;
determine first transfer data comprising:
the first invoice identifier,
a first hash of at least a portion of the second proposal data, and
first encrypted data, encrypted using the first invoice key, the first encrypted data comprising the first asset private key;
determine the signed first transfer data by digitally signing the first transfer data using the first device private key; and
send the signed first transfer data to the first general computing environment.

2. The system of claim 1, the first processor executing the first computer-executable instructions to:
receive, using the first communication interface, signed second transfer data; and
send the signed second transfer data to the first secure computing environment; and
the second processor executing the second computer-executable instructions to:
determine the signed second transfer data is validly signed, wherein the signed second transfer data comprises second transfer data, the second transfer data comprising:
the second invoice identifier,
a second hash of at least a portion of the second proposal data, and
second encrypted data, encrypted using the second invoice key, the second encrypted data comprising the second asset private key; and
store the second asset private key in the first secure encrypted memory.

3. The system of claim 1, the first processor executing the first computer-executable instructions to:
determine a failure to receive second transfer data responsive to the signed first transfer data, wherein the second transfer data comprises the second asset private key; and
send, using the first communication interface, to a third device:
at least a portion of the signed second proposal data.

4. The system of claim 1, the second processor executing the second computer-executable instructions to:
receive, using a first input device, user input; and
determine the user input is valid;
wherein the instructions to determine the first transfer data are responsive to the user input being valid.

5. A computer-implemented method comprising:
determining first invoice data comprising:
a first invoice identifier, and
a first invoice key;
determining first proposal data comprising:
a first asset public key,
the first invoice identifier,
a second asset public key,
a first device public key, and
data indicative of a condition of transfer of a first asset private key for a second asset private key, wherein:
the first asset public key is associated with the first asset private key, and
the second asset public key is associated with the second asset private key;
sending the first proposal data;
receiving signed second proposal data, wherein the signed second proposal data comprises second proposal data;
determining the signed second proposal data is validly signed;
establishing a secure channel between a first device and a second device;
determining, using the secure channel, that the first device and the second device are associated with a common authority;
sending the first invoice data to the second device using the secure channel;
using the secure channel, receiving second invoice data from the second device, wherein the second invoice data comprises:
a second invoice identifier, and
a second invoice key;
determining first transfer data comprising:
the first invoice identifier,
a first hash of at least a portion of the second proposal data, and
first encrypted data, encrypted using the first invoice key, the first encrypted data comprising the first asset private key; and
sending the first transfer data to the second device.

6. The computer-implemented method of claim 5, the determining the first device and the second device are associated with the common authority comprising:
verifying, by the second device, a first certificate provided by the first device with respect to a first certificate authority; and
verifying, by the first device, a second certificate provided by the second device with respect to the first certificate authority.

7. The computer-implemented method of claim 5, further comprising:
determining signed first transfer data by digitally signing the first transfer data using a first device private key that is associated with the first device; and
sending the signed first transfer data to the second device.

8. The computer-implemented method of claim 5, further comprising:
receiving, from the first device, the first proposal data at the second device;
determining the second invoice data;
determining the second proposal data comprising:
a second hash of the first asset public key,
a third hash of the second asset public key,
the first device public key that is associated with the first device,
a second device public key that is associated with the second device,
the first invoice identifier, and
the second invoice identifier;
determining the signed second proposal data by digitally signing the second proposal data using a second device private key that is associated with the second device;
sending the signed second proposal data to the first device;
receiving the first transfer data at the second device;
decrypting, at the second device, the first encrypted data;
determining second transfer data comprising:
the second invoice identifier,
a fourth hash of the second asset public key,
a fifth hash of the at least a portion of the second proposal data, and
second encrypted data comprising the second asset private key; and sending the second transfer data to the first device.

9. The computer-implemented method of claim 5, wherein the first encrypted data is encrypted using an encryption initialization vector exchanged using the secure channel.

10. The computer-implemented method of claim 5, the first proposal data further comprising: a third asset public key, and further wherein the data indicative of the condition of transfer specifies transfer of the third asset public key for the second asset private key.

11. The computer-implemented method of claim 5, the first proposal data further comprising: a third asset public key, and further wherein the data indicative of the condition of transfer specifies transfer of the second asset private key and a third asset private key associated with the first asset public key for the first asset private key.

12. The computer-implemented method of claim 5, wherein the first invoice identifier is a first nonce, the second invoice identifier is a second nonce; and
the method further comprising:
determining at the second device, second transfer data comprising:
the second invoice identifier,
a second hash of the second asset public key,
a third hash of the second proposal data, and
second encrypted data comprising the second asset private key;
sending the second transfer data to the first device; and
deleting, from memory of the second device:
the first invoice identifier,
the second invoice identifier,
the first invoice key, and
the second invoice key.

13. The computer-implemented method of claim 5, further comprising:
before sending the first proposal data, sending the second asset public key to a third device;
receiving, from the third device, historical data indicative of one or more prior transfers of the second asset public key; and
determining, based on the historical data, to proceed with sending the first proposal data.

14. The computer-implemented method of claim 5, further comprising:
- determining a second device public key that is associated with the second device;
- before sending the first proposal data, sending the second device public key to a third device;
- receiving, from the third device, historical data indicative of one or more prior transfers of the second device public key; and
- determining, based on the historical data, to proceed with sending the first proposal data.

15. A computer-implemented method comprising:
- receiving, from a first device, first proposal data at a second device, the first proposal data comprising:
  - a first asset public key,
  - a first invoice identifier,
  - a second asset public key, and
  - data indicative of a condition of transfer of a first asset private key for a second asset private key, wherein:
    - the first asset public key is associated with the first asset private key, and
    - the second asset public key is associated with the second asset private key;
- determining second invoice data comprising:
  - a second invoice identifier, and
  - a second invoice key;
- determining second proposal data comprising:
  - a first hash of the first asset public key,
  - a second hash of the second asset public key,
  - a first device public key that is associated with the first device,
  - a second device public key that is associated with the second device,
  - the first invoice identifier, and
  - the second invoice identifier;
- sending the second proposal data to the first device;
- using a secure channel, determining the first device and the second device are associated with a common authority;
- using the secure channel, receiving first invoice data from the first device;
- using the secure channel, sending the second invoice data to the first device;
- receiving first transfer data comprising first encrypted data;
- decrypting the first encrypted data;
- determining second transfer data comprising:
  - the second invoice identifier,
  - a third hash of the second asset public key,
  - a fourth hash of the second proposal data, and
  - second encrypted data comprising the second asset private key; and sending the second transfer data to the first device.

16. The computer-implemented method of claim 15, further comprising:
- sending the first asset public key to a third device;
- receiving, from the third device, historical data indicative of one or more prior transfers of the first asset public key; and
- determining, based on the historical data, to proceed with determining the second proposal data.

17. The computer-implemented method of claim 15, further comprising:
- sending the first device public key to a third device;
- receiving, from the third device, historical data indicative of one or more prior transfers of the first device public key; and
- determining, based on the historical data, to proceed with determining the second proposal data.

18. The computer-implemented method of claim 15, wherein the first encrypted data is encrypted using an encryption initialization vector exchanged using the secure channel.

19. The computer-implemented method of claim 15, wherein the first invoice identifier is a first nonce, the second invoice identifier is a second nonce; and
the method further comprising:
- deleting, from memory of the second device:
  - the first invoice identifier,
  - the second invoice identifier, and
  - the second invoice key.

20. The computer-implemented method of claim 15, the first proposal data further comprising: a third asset public key, and further wherein the data indicative of the condition of transfer specifies transfer of the third asset public key for the second asset private key.

* * * * *